United States Patent [19]
Robinson et al.

[11] Patent Number: 5,544,222
[45] Date of Patent: Aug. 6, 1996

[54] CELLULAR DIGTIAL PACKET DATA MOBILE DATA BASE STATION

[75] Inventors: Mark T. Robinson, Carlsbad; Steven H. Gardner, San Diego; Matt Wong, San Diego; Seton P. Kasmir, San Diego; Kumar Balachandran, San Diego; Sue Graham, Encinitas; Gail Schjelderup, Poway; Roy F. Quick, Jr., San Diego, all of Calif.

[73] Assignee: Pacific Communication Sciences, Inc., San Diego, Calif.

[21] Appl. No.: 152,005

[22] Filed: Nov. 12, 1993

[51] Int. Cl.$^6$ ............................. H04Q 7/30; H04Q 7/20
[52] U.S. Cl. ............................. 379/58; 379/59; 370/16; 370/17; 370/62; 370/67; 455/34.1
[58] Field of Search ................... 379/58, 59, 60; 370/16, 62, 94.2, 67; 455/34.1, 9, 17

[56] References Cited

U.S. PATENT DOCUMENTS

| | | |
|---|---|---|
| 3,564,150 | 2/1971 | Muller . |
| 3,575,558 | 4/1971 | Leyburn et al. . |
| 3,627,955 | 12/1971 | Stone, Jr. . |
| 4,128,740 | 12/1978 | Graziano ................................ 379/59 |
| 4,301,531 | 11/1981 | Lubin ..................................... 370/62 |
| 4,352,955 | 10/1982 | Kai et al. . |
| 4,654,867 | 3/1987 | Labedz et al. ....................... 379/59 |
| 4,661,972 | 4/1987 | Kai . |
| 4,730,187 | 3/1988 | Menich et al. . |
| 4,802,200 | 1/1989 | Murata et al. . |
| 4,812,843 | 3/1989 | Champion III et al. . |

(List continued on next page.)

FOREIGN PATENT DOCUMENTS

| | | |
|---|---|---|
| 0439926A2 | 8/1991 | European Pat. Off. . |
| 0521610 | 1/1993 | European Pat. Off. . |
| 2241854 | 9/1991 | United Kingdom . |
| 2260064 | 3/1993 | United Kingdom . |

OTHER PUBLICATIONS

Wirbel, "Connecting the Wirless World", Electronic Engineering Times., Mar. 1, 1993.
Weber, "PCs On the Go Are Causing a Burst of Activity", Electronic Times, Mar. 29, 1993.
2,063,901 Application for Canadian Patent for: Cellular Data Overlay System, Inventors: Slekys, Arunas G. et al.
Hildebrandt, Bernhard, "Die Basisstation Im Zellularen Funkfernsprechnetz C450", 2323 Telcom Report, 1985, No. 5.
Ehrlich et al, "Advanced Mobile Phone Service", Bell System Technical Journal, vol. 58, No. 1, 1979, N.Y.
America Online, "GTE Mobilnet", Jul. 11, 1995.
America Online, "Sprint Cellular Announced CDPD Trail Systems", Jul. 12, 1995.
America Online, "Limited Size Messaging (LSM) Protocal" Jul. 14, 1995.
Telular, "Cellular for the PBX!", Jan. 1993.
International Business Machines Corporation, "IBM Wireless Modem for Cellular/CDPD".
Inet, Incorporated, "Spider".

*Primary Examiner*—Curtis Kuntz
*Assistant Examiner*—William Cumming
*Attorney, Agent, or Firm*—Lowe, Price, Leblanc & Becker

[57] ABSTRACT

A cellular digital packet data (CDPD) system includes a mobile data base station (MDBS) configured to interface easily with an advanced mobile phone system (AMPS). The elements of the MDBS are arranged on modules and the functionality of the MDBS is divided among the modules to facilitate flexibility, compactness and quick expansion of the MDBS. To further facilitate compactness, the MDBS includes a transceiver/modem board which uses a single chip to carry out delta-sigma modulation. In order to maintain the integrity of CDPD transmission, a channel hopping scheme is used based upon avoidance of AMPS channel use. A distinctive protocol is used to encapsulate control/query/response data for transmission throughout the CDPD system. This protocol also facilitates easy control of each MDBS throughout the system.

52 Claims, 10 Drawing Sheets

U.S. PATENT DOCUMENTS

| | | |
|---|---|---|
| 4,825,456 | 4/1989 | Rosenberg . |
| 4,941,200 | 7/1990 | Leslie et al. ............................ 455/17 |
| 4,947,420 | 8/1990 | Stahl et al. . |
| 5,001,742 | 3/1991 | Wang ....................................... 379/60 |
| 5,020,091 | 5/1991 | Krolopp et al. . |
| 5,023,902 | 6/1991 | Anderson et al. ...................... 379/59 |
| 5,054,052 | 10/1991 | Nonami . |
| 5,115,514 | 5/1992 | Leslie ...................................... 455/9 |
| 5,117,449 | 5/1992 | Metroka et al. . |
| 5,128,980 | 7/1992 | Choi . |
| 5,148,473 | 9/1992 | Freeland et al. . |
| 5,153,903 | 10/1992 | Eastmond et al. . |
| 5,166,973 | 11/1992 | Hoff . |
| 5,175,758 | 12/1992 | Levanto et al. . |
| 5,195,090 | 3/1993 | Bolliger et al. . |
| 5,202,912 | 4/1993 | Breeden et al. . |
| 5,228,074 | 7/1993 | Mizikovsky . |
| 5,241,537 | 8/1993 | Gulliford et al. ...................... 370/67 |
| 5,247,700 | 9/1993 | Wohl et al. . |
| 5,345,597 | 9/1994 | Strawczynski et al. ............... 455/34.1 |
| 5,365,512 | 11/1994 | Combs et al. ......................... 370/16 |
| 5,365,524 | 11/1994 | Hiller et al. .......................... 370/94.2 |
| 5,457,680 | 10/1995 | Kamm et al. .......................... 370/17 |

CELLULAR DIGTIAL PACKET DATA MOBILE DATA BASE STATION

This application is related to and incorporates by reference U.S. patent application Ser. No. 08/117,913, filed Sep. 8, 1993, pending. This application incorporates by reference both of these applications.

TECHNICAL FIELD

This invention relates generally to wireless communication systems. More particularly, the invention relates to cellular base stations supporting transmission and reception of data, fax, and voice signals.

BACKGROUND OF THE INVENTION

Mobile wireless communication of analog voice signals was initially carried by half duplex radio systems. Citizens Band radio, one type of mobile wireless radio, uses amplitude modulation (AM) upon a carrier frequency to transmit or receive voice signals in a half duplex manner. Other mobile wireless radios used frequency modulation (FM) within a given carrier frequency range in order to transmit or receive voice signals, half duplex, achieving improved noise characteristics. These mobile wireless radios allowed a user to move within a given radius of antennas.

A disadvantage attributable to these systems was that once a user was beyond a certain range of a given base antenna, the radio channel for a given carrier frequency was inoperative. Another disadvantage was that wireless half duplex voice communication was unacceptable to most consumers. The consumer wanted a wireless duplex voice communication system similar to his or her wired home telephone.

In the 1980's, mobile wireless duplex voice communication using an analog FM based cellular radio was introduced into the marketplace. This analog cellular system for mobile wireless duplex voice transmission was called "Advanced Mobile Phone Service" (AMPS). Introduced by AT&T, the AMPS cellular network uses the FCC assigned carrier frequency range of 800 to 900 MHz. AMPS automobile cellular units were first permanently attached to the user's car. Automobile cellular units transmitted voice signals to a cellular base station within a given cell using one watt of power. Hand-held cellular units using battery power supplies were later introduced and transmitted voice signals to a cellular base station within a given cell using one quarter watt of transmit power. Because hand held cellular units operated from a battery power supply, the power consumed by the cellular phones became critical. When a cellular phone is powered on and waiting to receive a phone call, it is in a stand-by mode consuming less power than in an active mode. However, when the hand held unit is in a stand-by mode, it constantly listens for its registration number in order to become active and receive a phone call. The stand-by mode, although lower in power than the active communication mode, continuously uses a considerable amount of power. It is desirable to further decrease the amount of power used in the stand-by mode in order to further increase the time the cellular unit requires for recharging or replacing batteries.

The human analog voice was the signal that the AMPS system was first designed to communicate. The AMPS system was optimized for carrying as many analog voice signals within a given bandwidth of a channel as possible. Mobility of the cellular telephone using low power mobile units, FM modulation, and the higher carrier frequency range (800 MHz–900 MHz) is achieved through a cellular arrangement of antennas whereby a user's signal is handed off to the next cell site as he or she moves into a different cell area. This cellular handoff can cause a temporary loss in transmission or reception. However, temporarily losing a voice signal is not critical because a user knows when there is a signal loss and can retransmit the voice information. However, signal loss, even though temporary, poses special problems for transmission of digital data. Some other AMPS mobile cellular problems causing a loss in a voice signal are fading signal strength, reflections, Rayleigh fading, and cellular dead spots.

The availability of portable computers naturally led to the desire to transmit digital data via wireless from a remote location. Presently, the AMPS voice cellular system is being used to transmit digital data in the form of Circuit Switched Cellular Data across AMPS carrier channels. Raw (baseband) digital data is converted so that it can be transmitted and received across the analog AMPS system. One disadvantage to using the AMPS system is that a narrow channel bandwidth and errors in transmission limit the baud rate of transmitting and receiving digital data. Another disadvantage of using AMPS to communicate digital data is that movement of the subscriber unit may cause a cellular handoff to occur, thus causing a loss of the digitally transmitted or received information. Loss of digital data may corrupt a data file such that it is useless. Other losses of the raw digital data may be caused by other problems of the AMPS mobile cellular system.

Another wireless communication device is a pager. Most pagers use simplex or one way communication receiving only a limited amount of information such as a telephone number. Most pagers display only information to a user on demand and perform no other function. Because only one way communication is required, an acknowledgement is not returned by the pager to the original sender. In many cases it is desirable that a sending party receive an acknowledgement minimally, telling him or her that their page message was received. In some cases it may be appropriate to respond by leaving a return page message.

A disadvantage of present paging systems is that acknowledgment and return pages are not widely available because simplex paging is more commercialized than other paging modes. Another disadvantage of present pagers is that a displayed telephone number is not automatically and electronically dialed directly on a telephone. A user reads the telephone number from a pager's display and manually dials the number on a telephone in order to contact the paging party. It is desirable for a wireless pager to have the capability of automatically dialing a received telephone number on a wireless cellular telephone via electronic means, thus integrating the features of a wireless cellular telephone with that of a duplex pager.

A landline-dependent system that is presently widely used is a high speed fax-modem. Fax-modem hardware and firmware in conjunction with fax and data communication application software have the capability of sending digital data over various modem protocols as well as sending facsimile data by using the various facsimile protocols. Fax or data communication application software may operate on different hardware such as home or portable computer, personal communicator, personal digital assistant, or other electronic devices. Examples of modem protocols for standard modulated data are CCITT V. 22bis, CCITT V. 23, CCITT V.32, Bell103, and Bell212A. Modem protocols that include error control include CCITT V.42, MNP2, MNP3, MNP4, and MNP10. Modem protocols that provide data compression are CCITT V. 42bis and MNP5. Facsimile protocols include CCITT V.21, CCITT V.27ter, CCITT V.29, CCITT T.4, CCITT T.30, CCITT T.35, Class I-EIA/TIA 578, Class I-EIA 592, and Class II-EIA 578-SP2188. A fax-modem accepts raw (baseband) digital data from an electronic device over an internal data bus or external RS-232 port. Raw digital data is converted and modulated into data of a given protocol for transmission onto a standard telephone line. Data received from the telephone line can be converted from the modulated form into raw digital data that can be interpreted by the hardware, firmware and application software.

A disadvantage of present fax-modems is that most require a wire connection to a telephone line. Present methods of providing wireless capability for a fax-modem take the modulated analog modem output signal from a fax-modem and input this into an AMPS conversion unit. The AMPS conversion unit converts and modulates the transmitted analog modem output signal into a different analog form for transmission onto the AMPS network The analog modem output signal is converted into what is called Circuit Switched Cellular Data. Received AMPS signals can be converted from Circuit Switched Cellular Data by the AMPS conversion unit into analog modem input signals that the fax-modem can receive. Presently, fax-modems do not directly convert and modulate raw digital data into an analog signal for transmission onto the AMPS cellular network. A disadvantage of present methods of providing wireless fax-modem capability is that they require additional devices to send or receive fax and digital data over the AMPS cellular network. Another disadvantage is that more power is necessary for additional components, such as the AMPS conversion unit. Another disadvantage is that a user must carry the portable computer, fax-modem, and AMPS conversion unit to provide wireless fax-modem capability. It is desirable to incorporate a fax-modem and AMPS conversion unit into one unit providing the capability of sending Circuit Switched Cellular Data across the AMPS network.

A disadvantage of using Circuit Switched Cellular Data communication across an AMPS system is the requirement of the mobile unit to be stationary to avoid losing data from fading or cellular handoff associated with a non-stationary mobile AMPS communication. Thus, a mobile unit should avoid being moved even slightly when performing communication of Circuit Switched Cellular Data using the AMPS network.

Heretofore, providing efficient wireless transmission of both voice and data signals into one small hand held integrated package has been difficult. Furthermore, it is difficult to integrate the features of AMPS voice transmission with applications such as data transmission, electronic mail, duplex paging, as well as the provision of a Circuit Switched Cellular Data interface such as a wireless fax-modem, into a single hand held battery operated wireless unit. Further, the integration of these features into a single hand held unit has not been possible because of the unavailability of the underlying electronic components and application software required to integrate all these features into a single hand held unit. It is desirable to integrate AMPS voice communication and a data communication mode when moving between cell sites, as well as providing the capability of Circuit Switched Cellular Data Communication into one integrated hand-held unit. It is also desirable to provide a system supporting such communication to interface easily with existing AMPS systems.

BRIEF SUMMARY OF THE INVENTION

An object of the present invention is to facilitate the use of a cellular digital packet data (CDPD) mobile data base station with existing advanced cellular (AMPS) facilities.

A further object of the present invention is to use AMPS communication channels for CDPD communication in a manner entirely transparent to the AMPS system.

Still a further object of the present invention is to share front end equipment such as antennas, duplexers, and amplifiers with existing AMPS systems in a manner non-intrusive upon the operation of that AMPS system.

An additional object of the present invention is to reduce the size of the elements necessary for a CDPD mobile data base station.

Another object of the present invention is to program the mobile data base stations of a CDPD system using a protocol flexible for a variety of different types of communication.

Yet another object of the present invention is to provide modifications and expansion of the MDBS without impacting the associated AMPS system.

The aforementioned objects are carried out by a mobile data base station configured to transfer cellular digital packet data between a mobile subscriber and an external communication network. The mobile data base station includes a controller board operatively connected to the external communication network via a data link and a transceiver board providing a radio link to a mobile subscriber. The transceiver board is separate and distinct from the controller board.

Another aspect of the present invention is a method for conveying data from a network management system to a mobile data base station. The method includes the steps of encoding instruction data according to a predetermined MDBS utility protocol (MUP). The instruction data is further encoded according to a second protocol and then transferred over a DS0 line. The twice-encoded data is received at least at one MDBS and decoded according to both protocols so that the instructions can be carried out at the MDBS.

An additional aspect of the present invention is a method of operating a CDPD system having at least one mobile data base station associated with an AMPS system and connected via radio frequency link to a mobile end station. The method includes the steps of detecting at the MDBS all AMPS communications on all radio frequency channels associated with that AMPS system. From this data a list of channels is derived based upon AMPS use. The MDBS then sends the list of channels to any mobile end system within range of the MDBS. Each of the mobile end systems receiving the listed data then selects channels for CDPD use based upon the information in the list.

A further aspect of the present invention is a CDPD system associated with an AMPS system having at least one mobile data base station where the MDBS includes means for detecting AMPS communications on radio frequency channels encompassed within the AMPS system. The MDBS also includes means for deriving a list based upon AMPS use of the radio frequencies and means for periodically adjusting that list in response to AMPS use. The MDBS further includes means for sending data regarding the list to mobile end systems within range of the MDBS.

DETAILED DESCRIPTION OF THE PREFERRED EMBODIMENTS

One solution to the aforementioned difficulties of integrating portable voice and data communications resides in a new digital wireless communication technology developed to overcome some of the undesirable effects of transmitting raw digital data over the AMPS system. This new digital wireless communication system and network is called Cellular Digital Packet Data (CDPD). The CDPD communication system shares the same carrier frequencies assigned to the AMPS channels as indicated in Appendix II, and adheres to the standards specified in Appendix IV.

Figure 1:
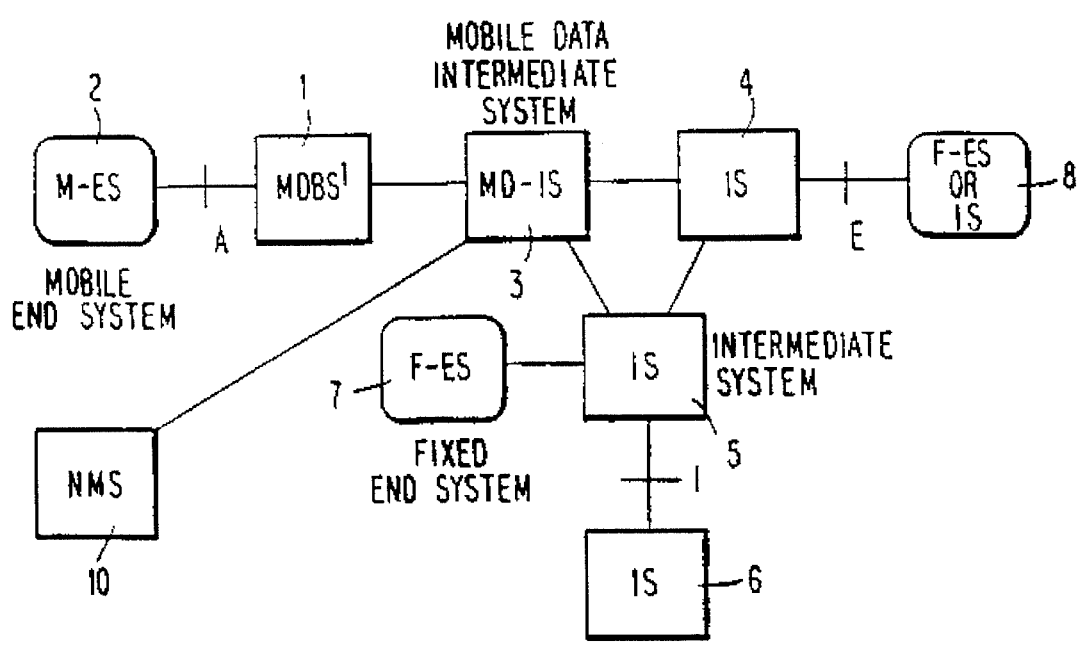
FIG. 1 is a block diagram of a CDPD system.

The base unit, mobile data base station (MDBS 1, as illustrated in FIG. 1), of the preferred CDPD system (MAV) utilize an channel within an AMPS cell to establish a link and communicate to a user's mobile end system. The MDBS may be applicable to other frequencies outside of AMPS that open up to it. The mobile end system (M-ES 2) is a portable computer, handset or other portable electronic device containing a subscriber communication unit. The MDBS serves as a communication link between the user of the M-ES 2 and a service provider's network of wire lines, microwave links, satellite links, AMPS cellular links, or other CDPD links (such as mobile data intermediate system MD-IS 3, intermediate systems 4, 5, 6) to convey data to another mobile end system, computer network, or non-mobile or fixed end-user system (F-ES 7, 8).

The CDPD network is designed to operate as an extension of existing communication networks, such as AMPS networks and the internet network. From the mobile subscriber's perspective, the CDPD network is simply a wireless mobile extension of traditional networks. The CDPD network shares the transmission facilities of existing AMPS networks and provides a non-intrusive, packet-switched data service that does not impact AMPS service. In effect, the CDPD network is entirely transparent to the AMPS network, which is "unaware" of the CDPD function.

The CDPD system employs connectionless network services (CLNS) in which the network routes each data packet individually, based on the destination address carried in the packet and knowledge of current network topology. The packetized nature of the data transmissions from a mobile end system 2 allows many CDPD users to share a common channel, accessing the channel only when they have data to send and otherwise leaving it available to other CDPD users. The multiple access nature of the system makes it possible to provide substantial CDPD coverage to many users simultaneously with the installation of only one CDPD station in a given sector (transmitting range and area of a standard AMPS base station transceiver).

The airlink interface portion of the CDPD network consists of a set of cells. A cell is defined by the geographical boundaries within the RF transmission range from a fixed transmission site such as MDBS 1, which can be received at acceptable levels of signal strength by mobile subscribers such as M-ES 2. The transmitter supporting the cell may be located centrally within the cell, with transmission carried out via an omni-directional antenna, or the transmitter may be located at the edge of a cell and transmitted via a directional antenna. This second type of cell is also referred to as a sector. In typical configurations, the transmitters for several sectors are co-located. The area served by a set of cells have some area overlap, so that a roaming mobile end system can maintain continuous service by switching from one cell to an adjacent cell in a manner roughly analogous to the standard hand-off in an AMPS system. The two cells are considered to be adjacent if an M-ES can maintain continuous service by switching from one cell to the other. This switching process is called cell transfer, and is done independently of normal AMPS hand-off procedures.

In FIG. 1, the interface (A) between the mobile end system 2 and the MDBS 1 is an "air interface" constituted by a radio frequency link using standard AMPS frequencies. The MDBS 1 is connected to other mobile data base stations through a mobile data intermediate system (MD-IS) 3. A number of mobile data base stations can be under the control of a single mobile data intermediate system. The mobile data intermediate systems are connected to each other through intermediate systems such as 4 and 5 in FIG. 1.

The intermediate systems are constituted by at least one node connected to more than one sub-network (such as an MD-IS). The intermediate system has a primary role of forwarding data from one sub-network to another. The mobile data intermediate system 3 performs data packet routing based on knowledge of the current location of each mobile end system within the range of the mobile data base stations under the control of the MD-IS. The MD-IS is the only network entity that is "aware" of the location of any of the mobile end systems. A CDPD-specific Mobile Network Location Protocol (MNLP) is operated between each MD-IS (through the intermediate system) to exchange location information regarding the mobile end systems.

The overall CDPD network is controlled by a network management system (NMS) 10 having an interface with at least one mobile data intermediate system 3. Using a special protocol, programming instructions can be transmitted from the NMS 10 through the MD-IS 3 to any number of mobile data base stations under the proper conditions.

Such programming instructions can be used to convey useful network data to the MDBS, as well as configuring the operation of an MDBS with respect to such critical features as maintaining channel queues. The NMS also controls other CDPD system characteristics such as the timing of paging messages to coincide with the non-dormant periods of the M-ES hand-sets. One advantage of the present invention is the capability of providing operating instructions to mobile data base stations from the NMS 10 through an MD-IS 3, or by a direct connection to the MDBS as is outlined in the detailed description of the MDBS architecture. The functions and protocol as carried out by each of the mobile end systems and the mobile data base station are explained in greater detail later herein.

Figure 2:
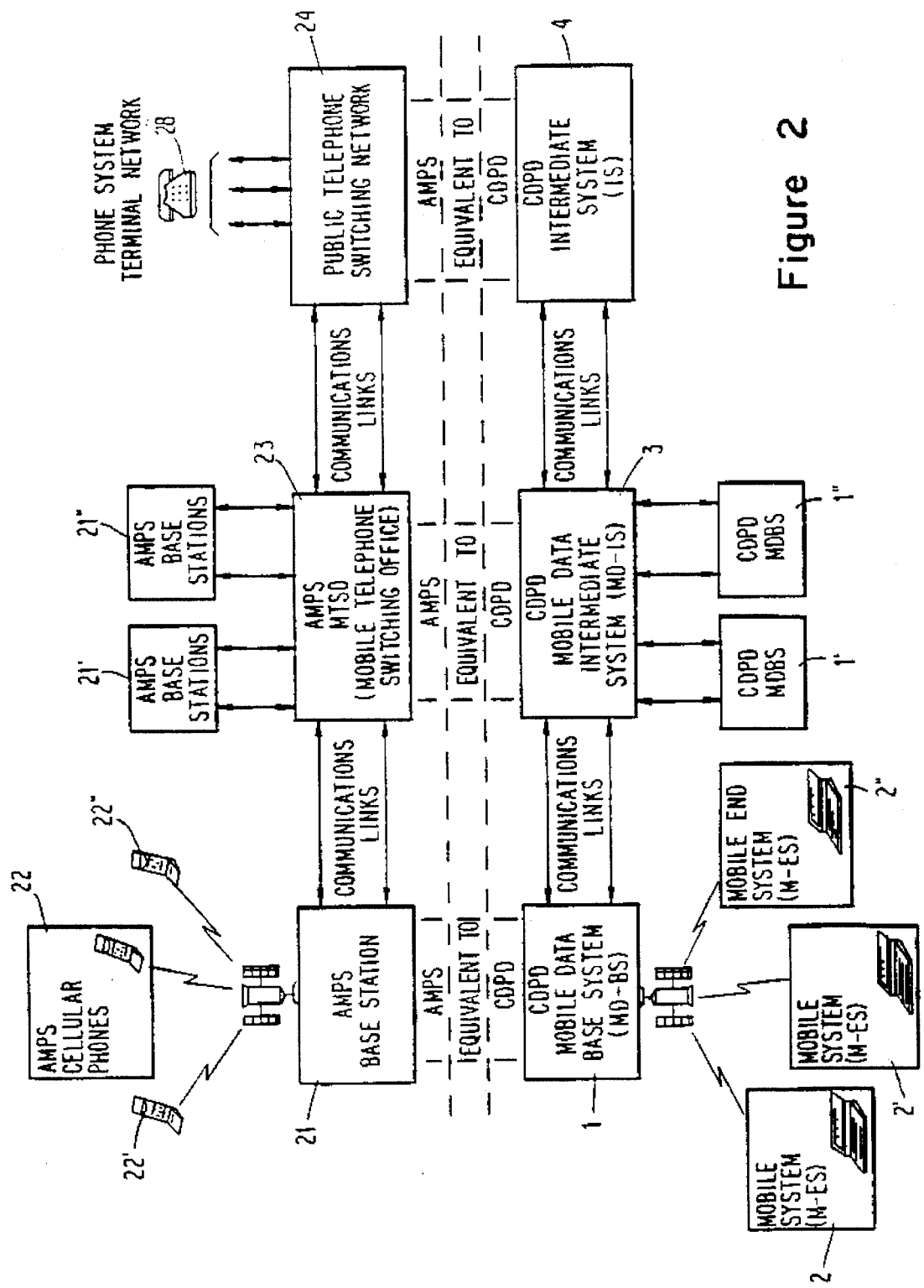
FIG. 2 is a block diagram comparing a CDPD system to an AMPS system.

FIG. 2 provides a comparison between the CDPD network illustrated in FIG. 1 and the standard AMPS network. The MDBS 1 is the CDPD equivalent to an AMPS base station 21. Both serve as links to mobile users, 2, 2', and 2" for the CDPD system and 22, 22' and 22" for AMPS users. As previously indicated in U.S. patent application Ser. No. 08/117,913, filed Sep. 8, 1993, both AMPS and CDPD functions are preferably handled by the same hand-set or end system equipment. Also, the MDBS 1 is preferably located with the AMPS base station 21 as be will explained in greater detail later.

The mobile data intermediate system 3 which acts as a local controller for the mobile data base stations connected thereto is equivalent to the mobile telephone switch office (MTSO) 23 used to control a plurality of AMPS base stations 21, 21' and 21". In the AMPS system, the MTSO 23 can be connected to the various base stations 21, 21', 21" by way of communication links, either over dedicated landlines or through a public switched telephone network (PSTN). Likewise, the connection between MD-IS 3 and the various mobile data base stations 1, 1', 1" controlled thereby is made in the same manner. However, different signaling protocols are used than those found in the AMPS system.

In comparison to AMPS, the infra-structure requirements of CDPD are very small. The CDPD base station equipment is located (preferably) at a cellular carrier's cell site along side existing AMPS base station cellular equipment. The multiple access nature of the CDPD system makes it possible to provide substantial CDPD coverage to many users simultaneously with the installation of only one CDPD radio in a given sector. This multiple access is the result of a mobile end-system accessing the CDPD channel only when there is data to be sent.

The AMPS base station and the MDBS can use the same RF links if both are co-located. (In contrast, the MTSO of the AMPS system and the MD-IS of the CDPD system do not have to be co-located in order to share RF links.) In the AMPS system, the MTSO 23 has the responsibility of connecting the AMPS base station and the mobile station to another party 28 through a public switched telephone network 24 (PSTN). The intermediate system 4 of the CDPD corresponds to the use of the PSTN by the AMPS system. Like the AMPS system, the CDPD system must also use the public switch telephone network or another landline network for completing calls to remote parties or systems such as 28. However, the CDPD system employs a different protocol than that used by the AMPS system for completing calls over a PSTN.

In general, the CDPD system illustrated in FIG. 1 operates to provide service to manage data communications to subscribers over a wide geographic range. When a mobile end system is located in its home area, data packets are routed directly to and from it by the home MD-IS via the home MDBS. The route via which data packets are forwarded to and from a mobile end system changes when the mobile end system roams out of its home area.

The CDPD system operates to provide a mobile home function (MHF), including a fixed reference location for each M-ES, where each M-ES is associated with a specific MDBS which is located in a fixed home area, and which keeps track of the location of the M-ES when it roams out of its home area. The MHF consists of two services: location directory service, maintaining an information base of the current serving area for each of the M-ES listed in the system; and a redirection and forwarding service, operating in a forward direction (from caller to mobile subscriber) only. The packeting forwarding service of the mobile home function routes packets destined for a roaming M-ES. In the forward direction (packets destined for an M-ES), packets are routed first to the MD-IS in the home area, then encapsulated and tunneled to the MD-IS in the current serving area. The packets are then routed to the called M-ES at its current cell location through the MDBS serving that cell. In the reverse direction (originating from an M-ES), packets are routed directly to their destination. There is no requirement for packets traveling in the reverse direction to carry the home MD-IS identification.

The MDBS maintains zero or more (up to the MDBS transmission capability) channel streams across the airlink interface, as directed by the MD-IS controlling that MDBS. The MDBS instructs all subscriber units to change channels when necessary such as when an AMPS communication is detected on the CDPD channel. Each subscriber unit's terminal stream is carried on one channel stream at a time, normally selected by the mobile subscriber, preferably based upon data received from the MDBS regarding optimum channels for CDPD use. The forward and reverse traffic in a given cell (its terminal stream) is carried on a single DS0 trunk, between the MDBS and the MD-IS. The communication between the MDBS and the MD-IS over the DS0 trunk follows standard formats such as T1.

Within the CDPD network, digital data is burst mode transmitted between a given subscriber unit (SU) within a mobile system and a mobile data base station (MDBS) using Gaussian Minimum Shift Keying (GMSK) modulation. Communicating in a burst mode fashion reduces the time that an SU communicates with an MDBS such that other SUs can talk with the same MDBS. For a given data size, the CDPD connect time is reduced considerably when compared to sending digital data over the AMPS network. Presently the raw (baseband) digital data envisioned being transferred across CDPD are electronic mail messages, digital fax data, or digital data representing a network connection such that files may be transferred as if currently connected to a local area network. Other CDPD applications are being developed such as CDPD duplex paging.

The MD-IS handles the routing of packets for all visiting mobile end systems in its serving area. When a M-ES registers for network access in an MD-IS serving area, the home MD-IS is notified of the current location of the subject M-ES. Two services are performed by the MD-IS: a registration service maintaining an information base of each M-ES currently registered in a particular serving location; and a re-address service, decapsulating forwarded packets and routing them to the correct cell. The serving MD-IS also administers authentication, authorization and accounting services for the network support service applications.

Within a cell area the MDBS first performs "RF sniffing" in order to detect an unused AMPS channel. CDPD use of an AMPS channel is limited to the idle time between AMPS channel access. If an AMPS cellular unit begins transmitting on a channel occupied by CDPD, the CDPD unit ceases transmitting on that channel and waits until the same channel becomes available or switches, referred to as channel hopping, to a different available channel.

Although the CDPD system shares existing AMPS radio frequency channels, as stated above, AMPS calls are given first priority, and they are always able to pre-empt the use of any channel being used by CDPD. However, the cellular service provider may opt to dedicate a channel or channels to CDPD usage. In this case, AMPS calls will never attempt to pre-empt the channels dedicated to CDPD use. It is noted that the use of such dedicated channels undermines optimum usage of AMPS systems in that the dedicated channels are no longer available for AMPS usage.

Normally, the MDBS functions to monitor activity on AMPS channels. Based upon this activity, a list or a series of list will be maintained at the MDBS to indicate those channels least likely to be used by the AMPS system and thus, most beneficial for possible CDPD use. This information is passed to each M-ES within range of that base station. Thus, each M-ES is provided with information as to which channel (out of all of those designated for CDPD use by the MDBS) will be selected in case the present CDPD channel is preempted by AMPS communication, as well as the most likely candidates for future channel hopping.

One aspect of normal CDPD systems is that CDPD communication is interrupted upon detection of an AMPS communication on the CDPD channel. Such interruption entails the loss of data with the consequent requirement that the lost data be retransmitted when another CDPD communication can be arranged via the MDBS. Also, once CDPD communication is pre-empted, the mobile subscriber must hunt for another channel available for CDPD communication, creating further delay. The situation can be avoided if AMPS usage can be predicted and channel hopping arranged to periodically select channels for optimal CDPD usage, and carrying out the channel hopping between data transmissions.

The base station described infra. is configured to carry out the aforementioned functions in the most efficient manner practical. The base station monitors all AMPS communications, derives a list (queue) of channels most likely to be selected for AMPS usage, and then derives a second list of channels most likely to be good candidates for CDPD usage based upon AMPS usage. This data is transmitted to each of the mobile end systems within the sector of the MDBS. Predicted channel hops are determined by the MDBS, and the channel to hop to is broadcast in a "switch channels message" to the subscriber units. A properly programmed subscriber unit will stop transmitting after getting a "switch channels message" and retransmit the data after acquiring the new channel. The mobile subscribers use the channel data broadcast from the MDBS to guide them in their search for a new channel after the channel hop has occurred. More particular procedures for deriving lists for optimum CDPD use are explained in greater detail, infra.

The CDPD system has the capability of easily interfacing with existing AMPS systems and sharing some front-end equipment with the existing AMPS system. To take advantage of this capability the MDBS must have the capability of physically interfacing with existing AMPS base stations. Consequently, the MDBS should be small, non-obtrusive, and easily accessible without interrupting existing AMPS equipment. The MDBS has to be configured so as to easily be connectable to equipment outside of the MDBS which is normally shared with the AMPS system. Thus, the MDBS must be easily connectable to the following pieces of external equipment found in the AMPS base station: an antenna system; RF power amplifiers (in particular, linear amplifiers can be shared with existing AMPS), RF multicouplers; power splitters; duplexers; and, optional equipment. Since the MDBS shares the environment of the AMPS base station, the MDBS should not constitute a substantial additional burden upon such support systems as environmental control and maintenance. Thus, the MDBS must be compact and flexible, constituting only those elements necessary for carrying out the MDBS functions necessary at that cell site.

Figure 3:
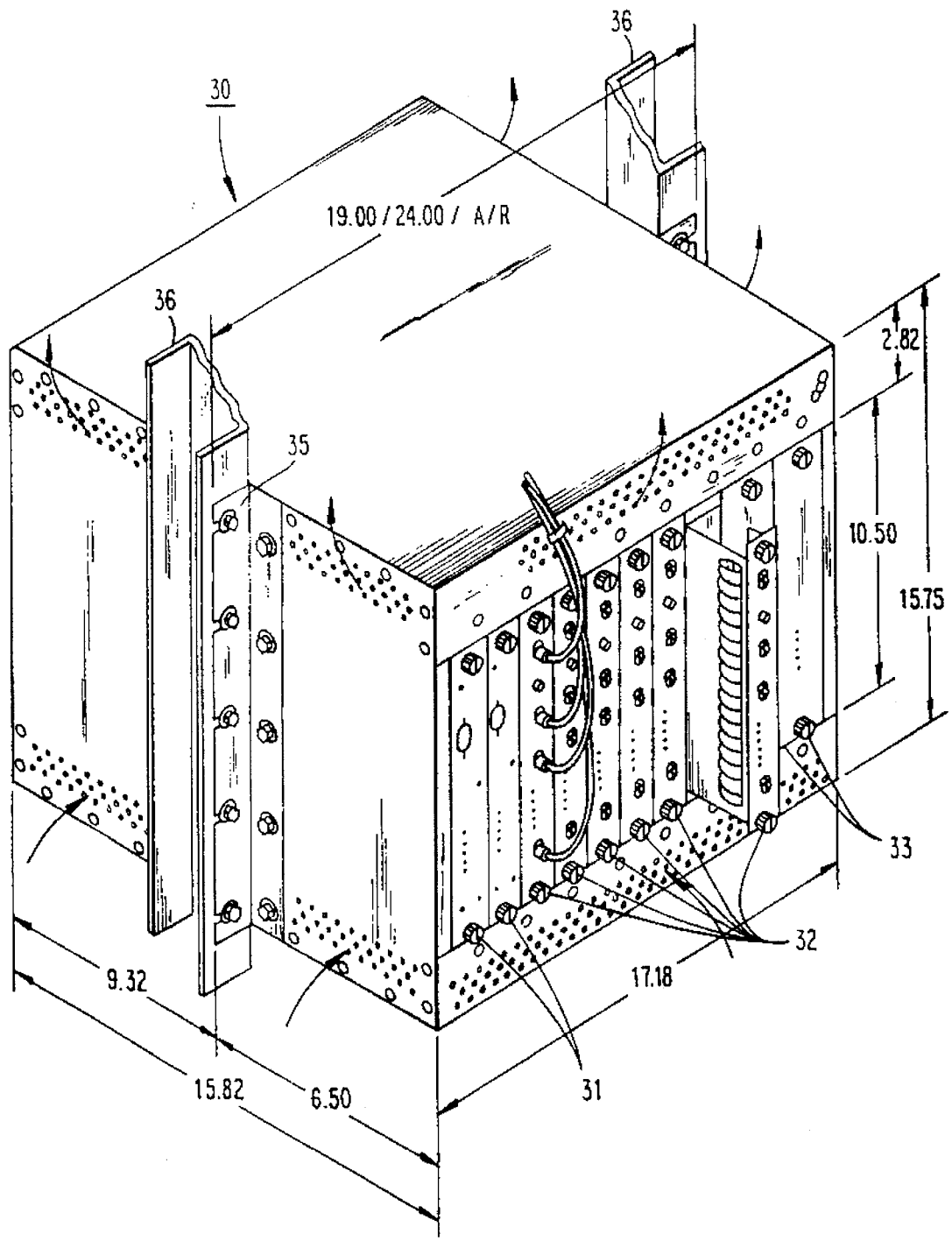
FIG. 3 is a perspective drawing of a chassis containing a mobile data base station.

In order to maximize compactness and modularity, the MDBS is arranged as shown in FIG. 3. A casing 30 is provided with angle hardware 35 used for mounting to vertical supports 36 arranged within the AMPS base station. Using this arrangement, the casing can be mounted at any height from the floor or ceiling within the AMPS base station structure. The flexibility is provided by the modular arrangement of the MDBS by which the functions of the MDBS are divided and arranged on separate boards slidably mounted within casing 30. Typical measurements for the size of the housing 30 are shown in FIG. 3. With this size housing, two controlled computer boards 31, 6 SNODEM boards 32 and two power converter boards 33 can be accommodated. However, casing 30 can be fabricated to accommodate more boards than shown in FIG. 3. Also, more than one such casing can be associated with an AMPS base station.

Whatever the size of the casing 30, the MDBS requires at least one control computer board 31, one power converter board 33, and at least one SNODEM board 32. However, even in a minimal arrangement two SNODEM boards 32 are considered preferable. The casing 30 is arranged to accommodate at least one DS0 connection (from the control computer board 31). The casing 30 also is arranged to accommodate connections to the aforementioned front-end equipment which is installed as part of the normal AMPS base station. In the alternative, the MDBS need not share the existing AMPS base station front-end equipment, and can use a front-end system dedicated solely to CDPD use. Casing 30 can be expanded to accommodate this dedicated front-end equipment.

As illustrated in FIG. 3, each board is slidably mounted within the casing 30, and can be withdrawn as shown. The boards are secured in place by standard hardware to prevent vibration and loose connections. The presence or absence of any particular board is detected by circuitry (not shown) connected to contacts connecting the board to the backplane. Each of the contacts between the boards and the backplane are designed with an impedance suitable to allow insertion and removal of the boards without arcing of power surges. This technique is well known in the electrical connection art. Further, details of backplane connections and operations are found in Appendices VII and XV.

Figure 4:
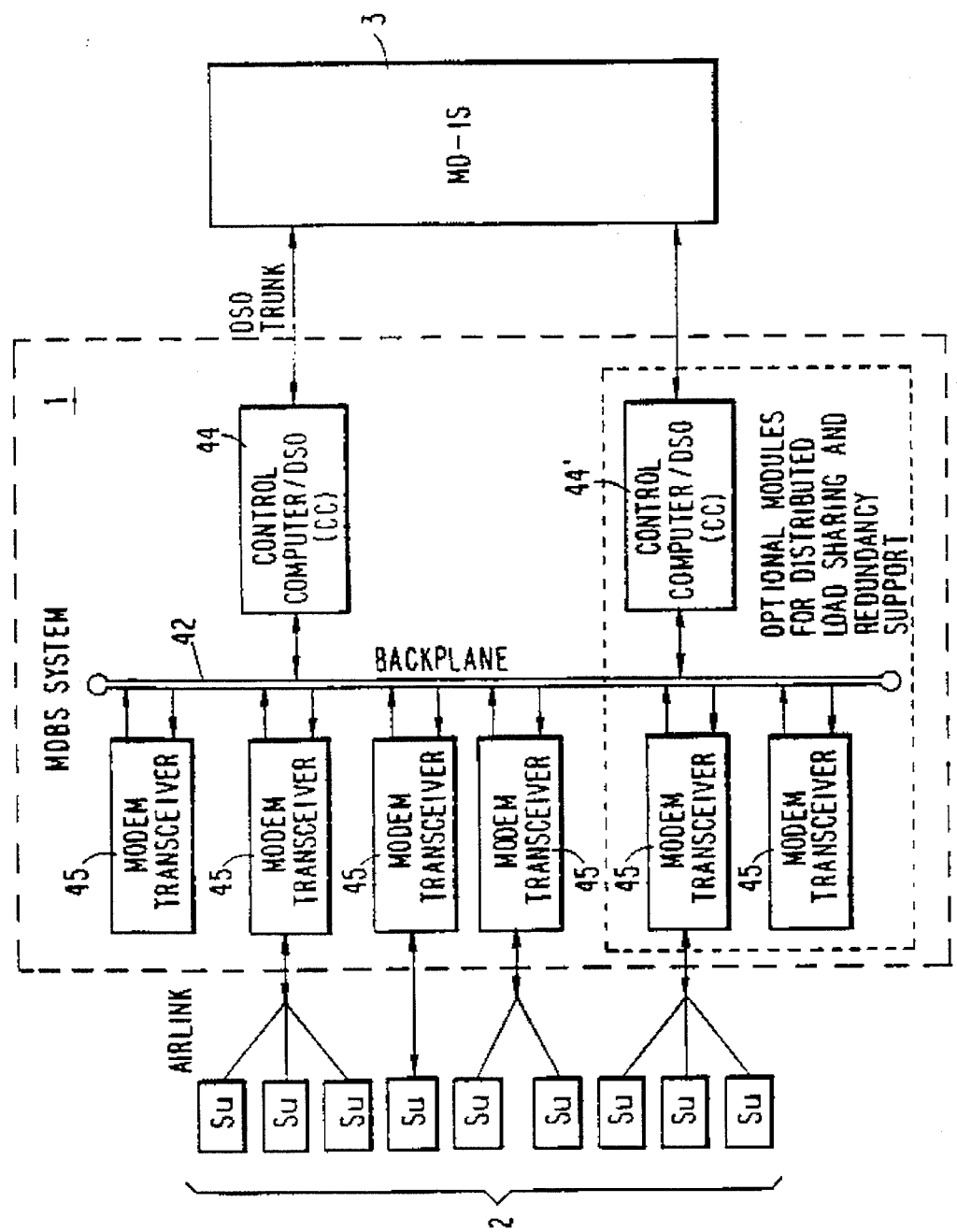
FIG. 4 is a block diagram of the overall MDBS architecture.

The connections between the various boards illustrated in FIG. 3 are facilitated by backplane structure 42 in FIG. 4. The backplane is constituted by a serial bus and is used to connect the control boards 44 and 44' to the various transceiver boards 45. The power board (33 in FIG. 3) is also connected to the rest of the system through the backplane 42. Each of the control computer boards 44, 44' is connected to the MD-IS 3 (in FIG. 1) through a DS0 trunk. The forward and reverse traffic of a given subscriber unit (its terminal stream) is carried on a single DS0 trunk between the MDBS and the MD-IS. It is the function of the MD-IS to reassign all subscriber units supported on a given DS0 trunk before deactivating that trunk.

As indicated in FIG. 4, a fully populated MDBS transceiver bank consists of two control computers 44, 44', six Sniffer/modem/transceiver boards 45 and two power supply boards (not shown). The second power supply board is necessary for redundancy, and serves as an aid in fault detection in a manner well known in the power supply art. Such a system can transmit and receive on up to six channels simultaneously. The six channels can be allotted to sectors in any fashion desired; for example, six CDPD channel pairs for an omni-directional site or two channels per sector for a three-sector site. The allocation can be changed by means of instructions received over the DS0 trunk by a control computer board in the MDBS. Normally, such instructions are sent from the NMS 10 (in FIG. 1). However, they can also be input locally using a utility port.

Channel capacity can be expanded by adding up to nine chassis (with a full complement of SNODEM boards), yielding a total of 54 simultaneous channel pairs for a single MDBS. Further expansion to the CDPD channel capacity is possible by covering the sectors (as defined by AMPS antenna coverage) with logically separate local mobile data base stations. However, such expansion could result in complications regarding the shared front end equipment necessary for transceiver operation (not shown in FIG. 4).

The chassis 30 of FIG. 3 is arranged to accommodate a Sniffer/modem/transceiver board with two receive RF port connectors, and a sniffer port connector. This is used to connect the sniffer found on the SNODEM boards to a place on the AMPS circuit appropriate for detection of AMPS communications on selected new frequency channels.

The MDBS contains one fault contact closure pair associated with each control computer board slot. A fault contact pair closes when any fatal fault is detected by the control computer associated with the contact pair. Fatal failures include power failure, failure of the control computer containing the contacts, or failure of all Sniffer/modem/transceiver boards. If only one control computer is installed, the contact pair associated with the vacant control computer board slot will be closed. If the MDBS is configured with two control computer boards, the contacts can be wired in series, in parallel, or individually monitored based on the desired resource management philosophy. If desired, the fault contact closures can be connected to the host (AMPS cellular base station).

Figure 5:
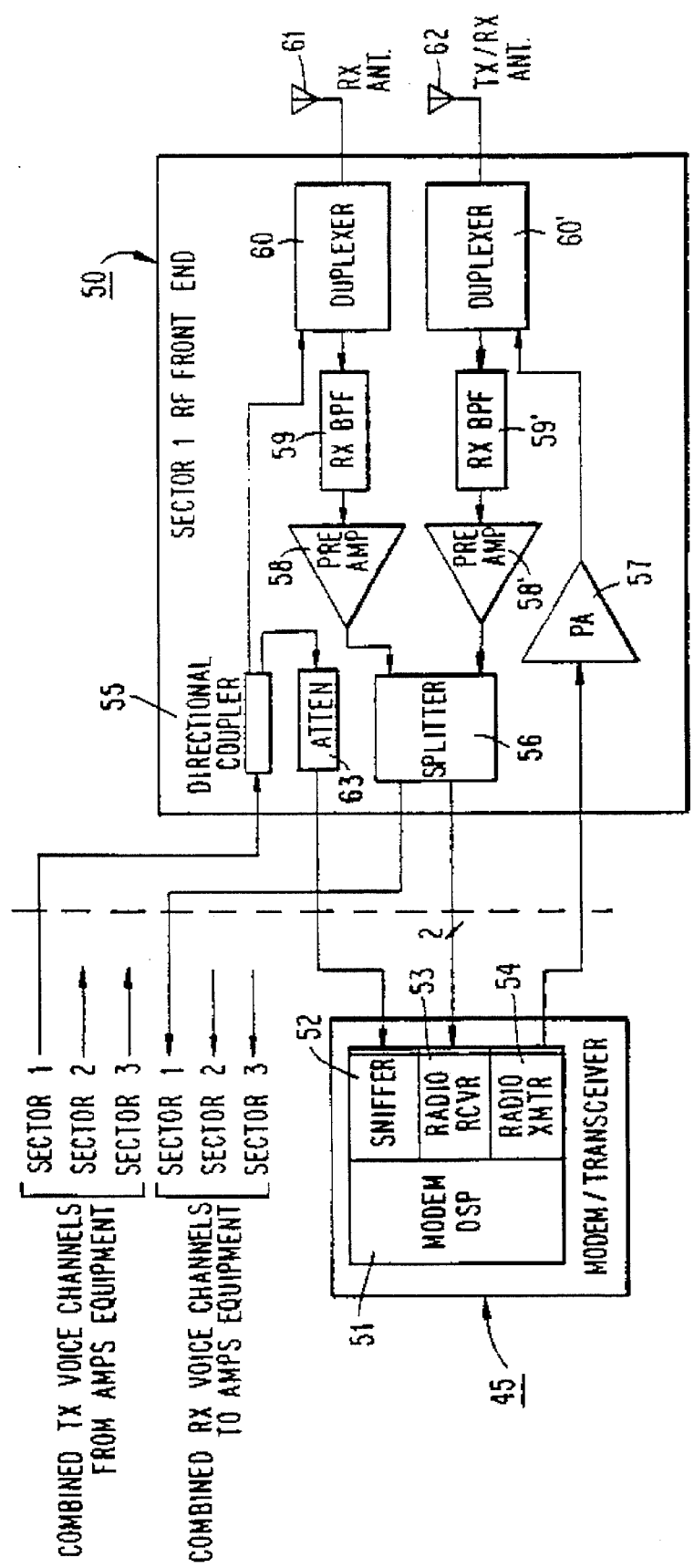
FIG. 5 is a block diagram showing the interconnections between the MDBS and shared AMPS front end equipment.

A more detailed representation of the Sniffer/modem/transceiver board 45 is illustrated in FIG. 5. The Sniffer/modem/transceiver board 45 is depicted as having a modem portion 51, for converting digital signals to analog radio frequency signals and vise versa in order to transmit representations of data processed in other parts of the system. SNODEM board 45 also includes sniffer 52 connected to detect AMPS communications. The radio receiver 53 and radio transmitter 54 are also included and are connected to the RF front end portion 50.

The front end portion 50 is expected to be shared with the normal AMPS base station. For each Sniffer/modem/transceiver (SNODEM) board 45, additional front end equipment used for AMPS transmissions can be connected to a respective SNODEM board as illustrated in FIG. 5. The front end equipment includes but is not limited to a directional coupler 55 for permitting the sniffer 52 to detect activity on AMPS channels used by other transceivers at the AMPS base station, and an attenuator 63 used to provide the proper power level to the sniffer 52. The preamplifiers 58 and 58' feeding a splitter 56 are used to amplify weak incoming signals for detection by a number of SNODEM boards 45. Radio frequency bandpass filters 59, and 59', are used as an aid to tuning the proper radio frequency signals. Power amplifier 57 is necessary to both the CDPD and AMPS communication systems in order to provide signals of sufficient strength to be received throughout the area covered by a base station. The duplexers 60, 60' are used to allow the antennas 61 and 62 to operate in more than one mode (transmit and receive).

Some installations employ three separate antennas per sector or cell, one for transmission and two for space diversity reception (as shown on page 2–5 of Appendix I). Typically, signals from both antennas 61, 62 pass through the band pass filters 59, 59', and preamplifiers 58, 58', and then are split into signals that feed each of the AMPS receivers. The antennas 61, 62 can also feed signals to the CDPD receiver 53, as shown in FIG. 5. In installations such as that shown in FIG. 5, the RF front end portion 50 that must be provided as part of the MDBS will consist of the sniffer coupler (directional coupler 55) a non-linear power amplifier 57 as well as the other equipment illustrated as part of front end portion 50.

It is also possible to use CDPD as an omni-directional channel system overlaying a sectorized AMPS cell site (not illustrated). In this case, a separate power amplifier must be used, and a non-linear amplifier (NLA) end receiver and bypass filter are also required since none of these items may be shared with the AMPS equipment. Such a system can be configured with two antennas using a duplexer or with three antennas without a duplexer. The sniffer must be driven by a signal formed by combining the coupled outputs of all sectors at the site. Alternatively, channels can be dedicated to CDPD operation and the sniffer disabled. However, this is generally undesirable for the reasons mentioned supra.

Many AMPS cell sites use non-linear power amplifiers for the transmitter with one amplifier per RF channel; in this case, each CDPD channel also requires its own power amplifier 57 as illustrated in FIG. 5. The duplexers 60, 60' are used to provide isolation between the transmitted signal and the receiver path. This results in a slight degradation to the AMPS sensitivity because any duplexers are high loss devices. Typical signal attenuation due to the duplexers are approximately 0.7 dB. Typical duplexer specifications are provided in Appendix I (Section 2).

In the alternative, a linear power amplifier can be used, the CDPD channels can be combined with the AMPS channels at low power levels prior to amplification by the linear power amplifier. This arrangement eliminates the need for separate power amplifiers and duplexers and reduces costs considerably. Thus, any number of different arrangements can be used for sharing front end equipment, so that FIG. 5 is not the only arrangement possible or practical for use with the mobile data base station of the present invention.

The arrangement of FIG. 5 can be altered by adding an additional receiver to the radio frequency portion of board 45 in FIG. 5. This additional radio frequency receiver can be connected to splitter 56 in a two-antenna arrangement, or can be connected to the third antenna (not shown), depending upon the specific characteristics required by the system operator. An antenna diversity scheme to optimize RF gain systems can be effected by adding a third shared antenna for reception (not shown) and a switch for selecting antennas. It is noted that antenna diversity can be constituted by any number of different arrangements and is not limited to that presented so far in this application. However, there must be sufficient processor capacity to accommodate necessary programming for switching between antennas.

Sniffer operation varies slightly depending on the front end arrangement used. The sniffer 52 samples the RF energy on channels coupled from the AMPS transmit path, and allows CDPD transmission only on inactive AMPS channels. (Further, details of sniffer wiring and operation are found in Appendices VI and XIV.) While the network is in operation, the sniffer continues to monitor both the channel in which the CDPD is active and other candidate channels for AMPS activity. If an AMPS connection is established on the channel that the CDPD system is using, the sniffer will rapidly detect the event, and the MDBS will hop to another unoccupied AMPS channel.

Subscribers (M-ES) are notified in advance of the channel that the MDBS plans to hop to (based upon a method disclosed infra), and when the M-ES detects the loss of the forward link (communications received from the MDBS), they also hop to the new channel. The channel hop and reacquisition occur rapidly enough so that there is no noticeable degradation in either AMPS service or CDPD service. Reverse link data packets (originating at the mobile end systems 2 as illustrated in FIG. 1) may be temporarily dropped as a result of channel hops, but higher level link protocols result in the retransmission and recovery of any data lost through such hops.

In the arrangement (using a non-linear power amplifier) where the AMPS and CDPD are not combined prior to sniffing because the CDPD signal is transmitted via one of the AMPS receive antennas, the sniffer needs only to differentiate between the presence and absence of a signal on the transmit antenna, and because the power level when AMPS transmission begins is very large (more than 50 dB), the sniffer can act very quickly to cause CDPD transmissions to cease once AMPS transmissions are detected.

In a configuration using linear power amplifiers (illustrated in Appendix I), the combined CDPD and AMPS signals appearing at the output of the AMPS power amplifier is coupled to the sniffer. Since the sniffer must detect only a small increase in the power on the channel resulting from the addition of the AMPS signal (typically 3 dB), it takes somewhat longer to determine when an AMPS transmission has started on a channel already occupied by CDPD. However, determining which channels are vacant takes no longer than in the case of non-linear power amplifiers.

The sniffer's determination of collisions is still made within the 40 millisecond window required by the CDPD system specification (Appendix IV), provided that the AMPS signal power level is no less than 2 dB below the CDPD signal power. This is the case in existing systems which are designed with no forward power control (power is set to a level adequate to provide coverage to the entire sector for all connections, which is also the case for CDPD) and those that do have forward power control but use full power until the connection is established and then are powered down.

In some cases, the sniffer can be eliminated from the transceiver modem card if the AMPS equipment can provide a signal indicating AMPS activity. In this case, a serial port connection is established to exchange AMPS and CDPD channel activity information. Use of this configuration can result in a cost savings since the SNODEM boards may be provided without the sniffer. In this configuration, three antennas are preferable as part of the front end portion (illustrated in Appendix I, Section 2) although only two can be used. The radio receivers 53 and radio transmitter 54 illustrated in FIG. 5 are essentially the same as those used for AMPS equipment in an associated AMPS base station. However, the modulation/demodulation (modem) and control portions of the SNODEM board 45, are specifically configured to provide a compact and modular MDBS for optimally transmitting and receiving CDPD signals using existing AMPS equipment. These attributes result from a division of functionality on both the SNODEM board and the control computer board.

The modem portion 51 of the SNODEM board 45 (FIG. 5) is responsible for all CDPD digital signal processing including GMSK (Gaussian minimum shift keying) modulation and demodulation, Reed-Solomon Error Correction Coding and Decoding, and other airlink data processing.

The radio transceiver portion 53, 54 performs frequency up-conversion and down-conversation to and from RF channels within the cellular band commanded by the control computer 44 (in FIG. 4). A synthesizer within the radio transceiver portion provides all required frequencies for these conversions. The transmitter output can drive most standard single channel AMPS cellular base station power amplifiers, but in the case of linear power AMPS it also includes a power level control circuit to allow the interface to adjust the power output by adjusting the power amplifier's drive level. The transmitter output signal is normally turned on or off under microprocessor control, but there is also a front-panel toggle switch (not shown in casing 30 in FIG. 3) which allows the output stage of the transmitter to be directly disabled. The receiver section of the radio transceiver preferably contains two complete down-conversion paths to support antenna diversity with signal combining. This provides significant performance improvement over non-diversity configurations, especially when receiving signals from moving mobile end system.

The SNODEM board is designed to transmit on the backplane 42 (in FIG. 4) only during an assigned time slot, and only if it has received a message from the control computer 44 (in FIG. 4). The SNODEM board also receives a health and status pole from the control computer 44 at least one per second. The control computer board cannot directly force a SNODEM board into a reset state. Consequently, it is up to the SNODEM board to make a determination and reset itself if appropriate upon detecting an internal failure. For example, the SNODEM board will reset if it stops receiving health and status poles from the control computer or if there is an indication that the queue of available optimum channels for CDPD transmission is blocked.

As previously indicated, each SNODEM board has a sniffer RF port connector located on its front panel. The connector type is SNA. The impedance of this port is 50 ohms with VSWR of not more than 1.5:1, and the impedance must be 50 ohms with a VSWR of 1.5:1 for proper operation. The sniffer can reliably detect the presence of an AMPS signal when the signal on the channel being measured has a power level in the range of −22 to −53 dBm at the sniffer RF port. The signal may be only an AMPS wave form, only a CDPD wave form, or summation of AMPS and CDPD. The sniffer will reliably detect AMPS combined with CDPD if the AMPS signal is no more than 2 dB smaller in power level than the CDPD signal. The MDBS will detect the onset of an AMPS signal (where onset is a time at which the AMPS signal attains a power level as described above) on the channel used by CDPD and will cease to transmit (i.e., the power level the MDBS transmitter port will be −70 dBc) on this channel within 40 milliseconds with probability of 99.9%. Additional characteristics of the SNODEM board are found in Appendix I, Section 1, and Appendices VI, XIII and XIV.

Figure 6:
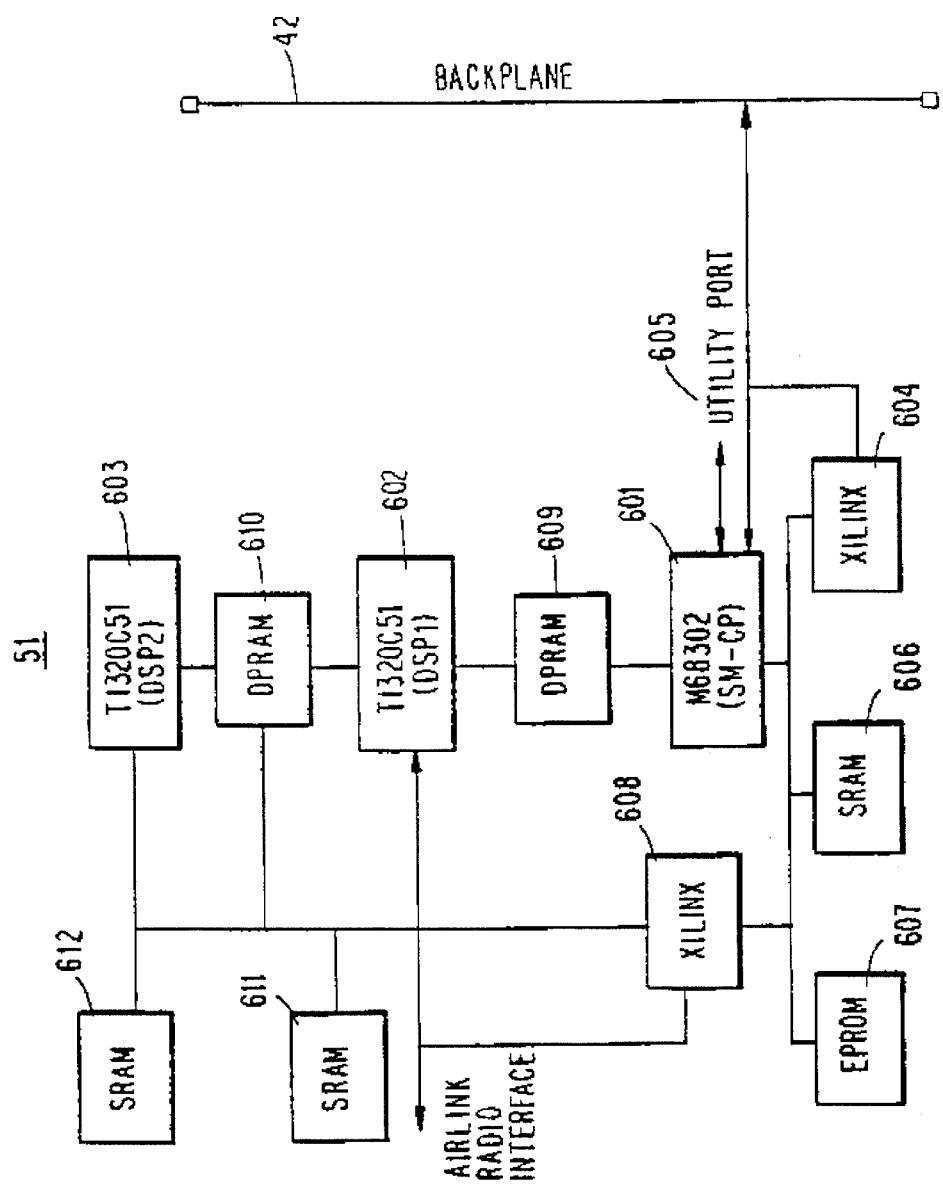
FIG. 6 is a block diagram of the architecture of the Sniffer/modem/transceiver board (SNODEM).

FIG. 6 illustrates the elements contained in the modem portion 51 (FIG. 5) of the SNODEM board 45 (further described in Appendices I, VI, XIII and XIV). In order to facilitate the division of functionality between separate boards (such as the SNODEM board and the control computer board), functionality is also specifically divided between the various elements on each board. The control processor 601 for the SNODEM is constituted in a preferred embodiment by a Motorola M68302 chip. This chip also functions as an input/output processor connecting the SNODEM to a utility port 605 and the backplane 42. The controller 601 is responsible for the following functions necessary for the operation of the MDBS:

1. maintaining an RF channel list for CDPD communication;
2. system start-up;
3. downloading code (from the control computer board 44 to the other components on the SNODEM board);
4. reporting the status of SNODEM board to the control computer board 44;
5. processing incoming and outgoing data packets including applying primitives of protocols conducted between the MDBS and external elements such as the MD-IS and the NMS;
6. processing serial and DPRAM interface commands;
7. scanning RF channels;
8. indicating presence of voice communication on CDPD channels;
9. indication of change of status in channels;
10. performing channel hopping;
11. routing packet types between the backplane and the digital signal processor;
12. frame flag insertion;
13. general message routing and maintenance of message routing queues;
14. generation and routing of channel queues to the control computer board.

Further explanation of these functions and the software used to carry them out is found in Appendices VII and VIII attached hereto.

The SNODEM board also contains two digital signal processors 602,603 each preferably constituted by a Texas Instruments TI320C51 chip. The first digital signal processor (DSP1) 602 carries out the following function:

1. converting signals to CDPD block format, and carrying out the reverse of this process;
2. carrying out a dotting sequence to detect the start of a burst of signals constituted by digital 1's and 0's; and
3. feeding samples to an analog digital converter on the same transceiver card.

The second digital signal processor (DSP2) 603 carries out the following functions:

1. converting CDPD blocks to a frame format, and reversing this process; and
2. carrying out error correction, preferably Reed/Solomon encoding.

It is noted that the second DSP function is primarily an auxiliary to the first DSP and can be replaced if the first DSP is constituted by a faster processor with more memory.

Utility port 605 permits a CDPD operator to carry out hardware/software diagnostic and repair activities. To access the system, the operator will be required to log on and enter a password correctly. The CDPD software described in Appendices VI, X and XIII of this application will support operator entry of the following commands:

1. initiate CDPD operation (i.e., transmit forward channels, receive and process reverse channels);
2. add and delete CDPD logical channels;
3. terminate CDPD operations (i.e., cease transmission of forward channels and process of reverse channels);
4. display current MDBS equipment status;
5. display current analog activity (i.e., RF sniffing data);
6. display event/alarm log containing the last entries;
7. monitor system operation;
8. display/edit MDBS data base;
9. command diagnostic execution; and
10. exit CDPD software and return to operating system prompt.

Additional functions and elaboration of the aforementioned functions can be found in Appendix XII of this application.

Also included are two XILINX field programmable gate arrays (FPGA) 604,608. These are relatively simple processors in terms of functions as compared 601, 602 and 603. However, each XILINX array has a relatively high number of input/output ports as compared to the other processors on the SNODEM. Consequently, the XILINX arrays facilitate certain operations necessary in the MDBS using a minimum of physical space and processor capacity. The first XILINX array 604 is operatively connected to the backplane and processor 601 (as well as SRAM 606, EPROM 607 and XILINX 608). This array carries out the following functions:

1. interface with the backplane 42;
2. hardware polling; and
3. generation of slot designation signals.

The second XILINX array 608 functions as a digital-to-analog (D-A) converter and as a A-D converter. This converter is configured so that digital filtering is carried out. This XILINX array also carries out signal division to provide signals for the phase lock loops required on the SNODEM board.

The second XILINX array 608 is configured to carry out delta-sigma modulation thus eliminating more elaborate and space-consuming circuitry. The elements including in this configuration are illustrated in FIG. 7, and are entirely contained within the second XILINX array 608 (with the exception of the lowpass filter 707).

The delta-sigma technique can be very useful in most applications for sample rates below 100 kHz and may have significant applicability at higher rates. The delta-sigma approach for CDPD communication allows replacement of standard DAC and a four or five pole anti-alias filter using-a simple accumulator and a two-pole lowpass filter in this particular application.

Figure 7:
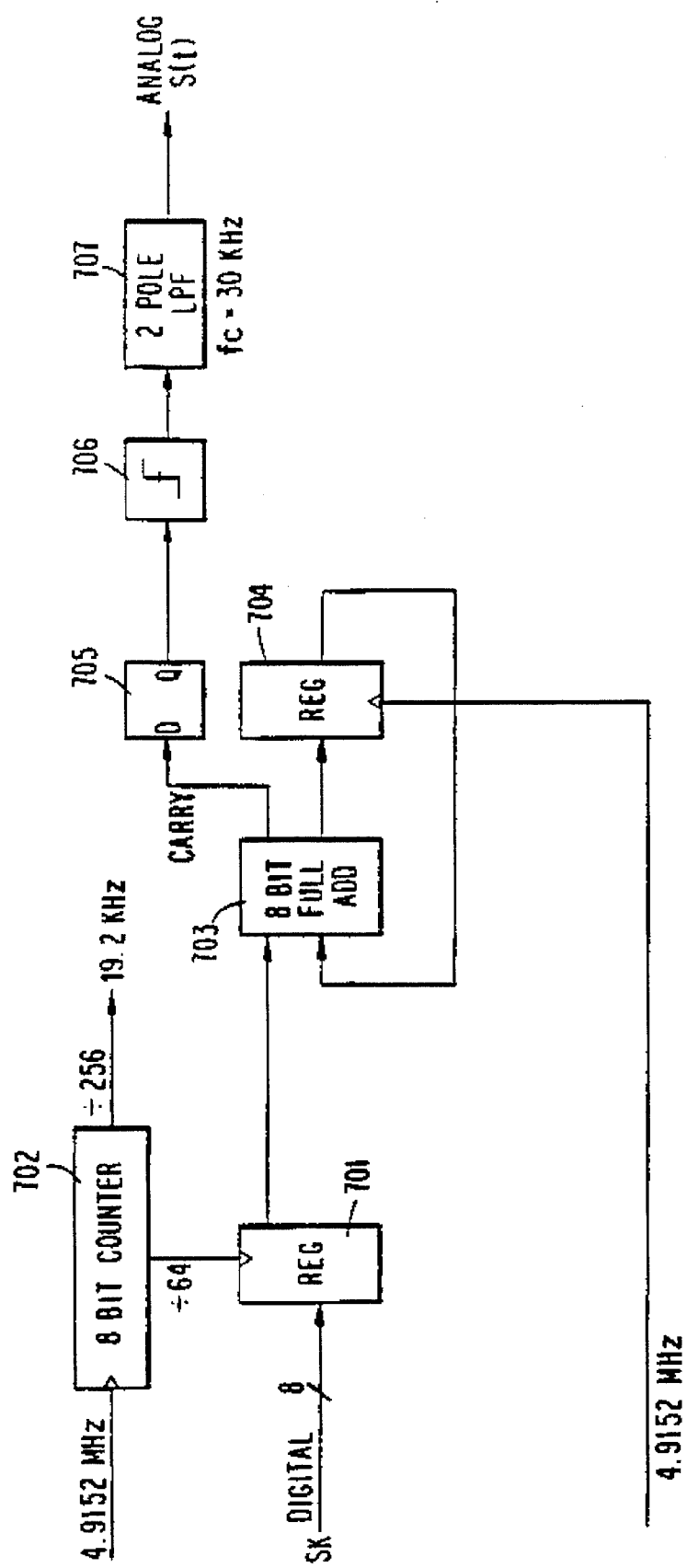
FIG. 7 is a block diagram showing the functional elements in a delta-sigma modulator contained on the SNODEM board.

The object of the circuit illustrated in FIG. 7 is to put the noise associated with the sampling of an input signal in Gaussian terms and then spreading the power spectrum of the noise signal so that a major part of the noise waveform can be eliminated using a simple low pass filter. The circuit in FIG. 7 carries out the necessary manipulation to allow the two-pole low pass filter 707 to eliminate the majority of the quantized noise associated with signal sampling due to the spreading and a shaping of the noise wave form into a Gaussian-like signal which can be shifted, and to a large extent eliminated. The derivation in terms of signal manipulation of the circuit shown in FIG. 7 is found in Appendix V attached hereto. As illustrated by FIG. 7, a digital signal Sk is input to register 701. Sampling of this signal is controlled by an eight bit counter 702 to produce a 8-bit output to be sent to adder 703. The input frequency of 4.9152 MHz to the 8-bit counter 702 is generated on the SNODEM board and is divided by 64 to control register 701. Another frequency division is carried out in the 8-bit counter 702 to produce an output of 19.2 kHz which is used in another part of the SNODEM board. The original frequency of 4.9152 MHz is used to control register 704 which receives the output of adder 703. As a result, register 704 samples at a much higher rate than register 701 and sends back its output signal to combiner 703. The result is a carry signal (output signal) more closely approximating an analog signal due to the high sampling rate of register 704. This output is fed to a D flip-flop 705 which cleans up glitches created in the carry circuit by other circuit components. Limiter 706 assures that the level of the output stay constant and remains in a form translatable to an analog signal. The output of limiter 706 results in a signal St swinging from +V to −V absent a substantial portion of the noise resulting from the sampling carried out in register 701 by bit counter 702. Using this configuration, the DAC and ADC circuitry (except for the lowpass filter 707) is contained in one XILINX array, thus, eliminating the need for the substantial space required by conventional DAC and ADC devices. As a result, the entire circuitry necessary can be maintained within the SNODEM board effecting the necessary modularity within the MDBS.

The other elements illustrated in FIG. 6 cooperate with the aforementioned digital signal processors and XILINX arrays. SRAM 606 is used to hold an operational code. EPROM 607 permits additional functions by the I/O processor 601. The DPRAM 609 is used as a buffer for all communication between the first digital signal processor 602 and the I/O processor 601. EPROM 610 serves the same function between the first and second digital signal processors 602, 603. The two digital signal processors 602, 603 use SRAM 611, 612, respectively for holding and buffering information.

Optimum channels for CDPD communication are based on queues of the optimum channels for AMPS communications. However, future channels dedicated to CDPD use may become available. With CDPD communication those channels selected for optimum use are those channels which are least likely to be used in AMPS communications and thus, correspond to those channels at the bottom of the AMPS queues. The list (queue) of channels to be considered for CDPD use is derived in much the same fashion as those used for AMPS use. In both cases, communications channels are divided into two areas based upon traditional use. The first area is the original RF channel spectrum allocated for cellular communication and the second area is based upon the extended RF channel spectrum developed after the original allocation for radio telephone communication was made. The most heavily used (by AMPS) group of channels is in the extended spectrum since this area is allocated first in order to reserve the original spectrum for those systems which do not have the capacity to use the extended spectrum. As a result there will be two queues. One used for the original spectrum and one for the extended spectrum.

The CDPD system of the present invention will use these two queues in much the same way except that the last used AMPS channel will always be at the bottom of the AMPS queue while the same channel will always be at the top of the CDPD queue since it is a channel least likely to be used in AMPS communication. This is done for both the extended spectrum area and the traditional spectrum areas. Since the traditional spectrum area is least likely to be used for AMPS communication because of the assignment in priority to the extended spectrum, the traditional spectrum will have the highest priority for CDPD usage. If AMPS system is limited to the traditional spectrum, and a CDPD mobile data base station having capability in the extended spectrum is adjoined thereto, then the most likely channels for CDPD use would be found in the extended spectrum rather than the traditional spectrum.

In a variation of the original arrangement each of the spectrums can be divided into two lists of channels. The first in each spectrum designated as A and the second designated as B. One of these lists can be given priority over the other based upon any number of factors determined by the system operators. The priority of the lists can be changed from A to B periodically, for example, every half hour, in order to offset overuse of the high priority group.

The logical algorithms used for channel assignment can be selected for the best possible compatibility with the different types of AMPS channel assignment strategies to minimize potential for collisions, and also to avoid conflicts with "sealing techniques employed by some AMPS equipment". "Sealing", sometimes called "foreign carrier detection", is a technique used in some AMPS cell site equipment in which unused channels are probed for the presence of RF energy, and, if energy is present, are "sealed" from AMPS usage until the energy goes away. CDPD signals appear to AMPS as a foreign carrier and would result in the effected channel being sealed. Thus, in a cell site with sealing capability, if CDPD dwells on a channel long enough to trigger sealing, it will end up degrading AMPS capability because the AMPS system will avoid using that channel until the CDPD communication hops to another channel.

Now referring to FIG. 6, the backplane 42 is used to communicate between the control computer board (S) 44, 44' (in FIG. 4) and the SNODEM boards 45, as well as the power supply boards illustrated in FIG. 3. The backplane consists of two independent serial interfaces that allow communication to all the MDBS cards. The backplane carries the following signals:

1. a 1.4 MHz clock;
2. signals indicating the start of a new time slot (SNODEM boards only being allowed to transmit during their assigned slot);
3. serial data driven by any board that has data to send during its assigned time slot; and
4. identity bits providing the backplane bus slot identity for each individual board.

Only one backplane is active at any instant. The master control computer 44 (in FIG. 4) determines which backplane to use and when to switch to the second backplane in the event of a fault. Faults of the backplane include loss of clock, loss of data stream, loss of protocol slot timing information and jammed data bus due to a faulty continuous transmission. The backplane is also crucial to the selection of a master control computer board 44 if more than two control computer boards are used in the MDBS. The backplane is also necessary for redundant operation of certain MDBS elements in the event of fault detection.

Each board in the MDBS contains one contact closure pair associated with each control computer slot. A fault contact pair closes when any fatal fault is detected by the control computer associated with the contact pair. Fatal failures include power failure, failure of the control computer containing the contacts, or failure of all SNODEM boards. If only one control computer is installed, the contacted pair associated with the vacant control computer slot will be closed. If the MDBS is configured with two control computers, the contacts can be wired in series, in parallel, or individually monitored based on the desired resource management philosophy. If desired, the fault contact closures can be connected to the host cellular base station.

Redundant operation is especially critical with respect to the power supply modules. Each one of these slides into one of two power supply slots at the front of the casing 30 (in FIG. 3). Each power supply module accepts 24 VDC from the main DC power bus available at cell site base stations and generates the voltage forms needed for operation of MDBS modules. The power supply board also provides power conditioning to reduce the effects of noise and a voltage variation on the main battery line, and controls the sequencing of the voltage forms during power turn-on as required by the MDBS boards. Redundancy can be provided for improved reliability, with a hot switch capability that allows uninterrupted operation through single point failures.

During normal operation the power supplies share the load. If one power supply fails, the other power supply takes over the entire load following one of a number of different methods well known in the art of providing uninterrupted power. Each power supply board has two status lines that are periodically read by the control computer. The first line is an over voltage status line and the second is an under voltage status line. In addition, there are two control lines that can be asserted by the control computer in the event of a power supply fault, i.e., over voltage, under voltage or over current conditions. Under normal conditions, the control computer cannot assert control over the power supply via these two control lines. After these control inputs are enabled, the control computer can turn off the power supply at any time, regardless of the internal power supply conditions.

The MDBS is designed to cover single point failures. In general, this is accomplished by switching in a redundant component without management intervention. The minimum fully redundant configuration for a cell sector supporting a single CDPD channel consists of two control computers, two SNODEM board and two power supply boards.

Figure 8:
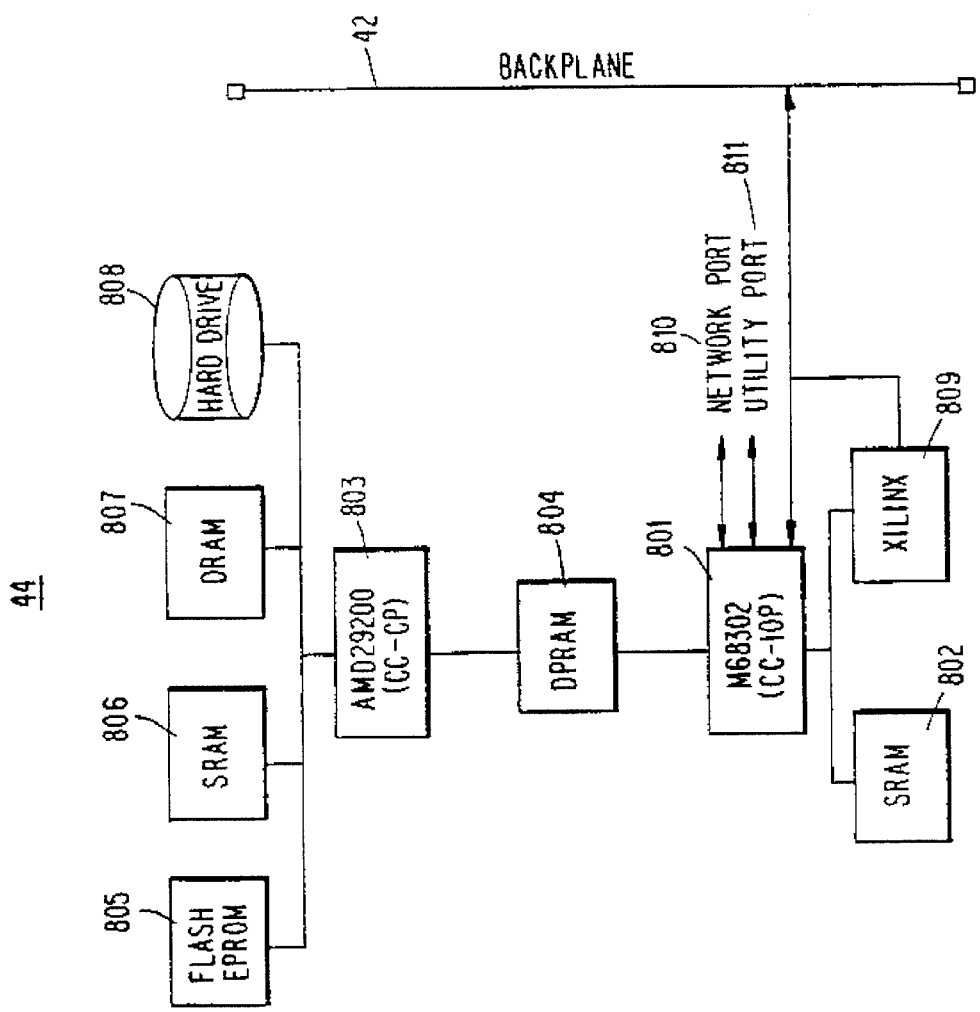
FIG. 8 is a block diagram of the control computer architecture.

FIG. 8 illustrates the elements arranged on the control computer board 44. The control processor 803 of the control computer board is preferably constituted by an advanced micro devices (AMD) 29200 chip. This chip carries out the following functions:

1. periodically polling all other boards for help or status information;
2. reporting alarm, health and status information to the network management system (NMS) through the network port 810 using a DS0 line;
3. radio resource management and generation of commands to the SNODEM boards;
4. generation and distribution of master clock timing; and
5. downloading software to all other boards in the MDBS (if the control computer board is the master control computer board).

If more than one control computer board is utilized in an MDBS, a designation of the master control computer board is made by default on the basis of the slot into which the control computer board is placed. The control computer board designated as the master downloads external instructions to all other boards in the MDBS. The master control computer board can also serve as a master for other MDBS chassis. Additional slave computer control boards can be added for more channels or faster processing. Those control computer boards not designated as a master have a peer-to-peer relationship. The master control computer is particularly important for distributing information to the other control computers and other SNODEM boards in the MDBS by such instructions that are received from an external source such as the NMS.

In case of massive software loss (except for the boot code which is stored in EPROM 607 on the SNODEM boards), software code can be downloaded from external sources such as the NMS into the control computer board. This download is made over a DS0 line connected to utility network port 810 (FIG. 8) connected to input/output processor 801 using high-level data link control (HDLC) protocol. Software can be downloaded through the network port 810 or the utility port 811 to the control processor 803 and must pass through input/output processor 801. This process can be carried out when software disruption occurs or when the system is reprogrammed. During the process, the MDBS is shut down until the new software is loaded into the control computer board. If the reprogramming is prearranged and fails to work, the control computer board can fall back on the old programming still retained in hard drive 808 (FIG. 8).

Upon determining the acceptability of new software, the control computer board downloads appropriate software to the other boards contained in the MDBS. If reprogramming cannot be accomplished over the DS0 line to the network port 810, a utility port 811 can be used to permit a programmer to input new software at the site of the MDBS. Only the boot code is needed for an operator to carry out this process. This process is used only as a backup should the programming over the DS0 line fail since reprogramming each MDBS using the utility port is a tedious and time consuming process.

Preferably, the reprogramming is conducted from a network management system (NMS 10 in FIG. 1), as is maintenance, monitoring and adjustment of each MDBS throughout the CDPD system. This is accomplished by means of a special protocol conveying information between the NMS and the MDBS, preferably transparent to all other parts of the CDPD system therebetween.

The control computer board input/output processor 801 (FIG. 8) is preferably a Motorola M68302 chip, connected to SRAM 802 and XILINX FPGA array 809, as well as network port 810, utility port 811, dual port RAM (DRAM) 804 and backplane 42. This array carries out the following functions:

1. system start-up and related system functions;
2. serial backplane bus communication;
3. utility port communication;
4. DS0 port communication;
5. packet data transfer;
6. debug monitoring;
7. sorting and routing of data into predetermined queues;
8. placement of CDPD frame headers; and,
9. inserting frame flags for identification and transmission on DS0 channel.

There is also a XILINX array 809 operatively coupled to both the backplane and I/O processor 801. Like the XILINX array 604 (in FIG. 6) on the SNODEM board, this XILINX array carries out the following functions:

1. interfacing with the backplane board;
2. hardware polling; and
3. generation of slot designation signals.

In FIG. 8, communication between the control processor 803 and the I/O processor 801 is carried out by a dual port RAM (DPRAM) 804. The control processor 803 is enhanced by SRAM 806 for the purposes of carrying out management functions. Operational codes are executed out of DRAM 807. The majority of the files necessary for the operation of the MDBS are contained in the Hewlett Packard Kitty Hawk hard drive 808.

The other elements found on the control computer board are described in Appendices VII–XI attached hereto.

The control computer board 44 (FIG. 4) communicates with the SNODEM board 45 over backplane 42. The control computer board transmits CDPD frames, radio resource management commands, SNODEM control commands, and network management system queries to the SNODEM board 45. In return, each SNODEM board 45 sends CDPD frames, sniffer data, SNODEM status signals and network management system (NMS) information to the control computer board 44. Within the control computer board 44, the input/output processor 801 (FIG. 8) communicates with backplane 42 as well as the network port 810 over a DS0 line. The input/output processor 801 communicates with the control processor 803 by sending CDPD frames, sniffer data, SNODEM status signals and NMS information to the control processor 803. In return, the control processor sends CDPD frames, radio resource management commands, SNODEM control signals and NMS queries to the input/output processor 801. The network port 810 handles incoming CDPD frames, adjacent MDBS channel status and NMS queries and commands. The MDBS sends CDPD frames, CDPD channel status and NMS information over the DS0 link through network port 810.

Within the SNODEM board 45 the input/output processor 601 (FIG. 6) sends CDPD frames, radio resource management commands, SNODEM control commands and NMS queries to the two digital signal processors 602, 603. These in turn communicate CDPD data to the radio receiver 53, radio transmitter 54 and RF front-end 50 which in turn conveys the CDPD data over the airlink to mobile end systems such as M-ES 2 (FIG. 1). Referring to FIG. 6 the two digital signal processors sends CDPD frames, sniffer data, SNODEM status signals and NMS information (in response to queries) to the input/output processor 601. In turn, this processor sends the appropriate signals to the control computer board 44 as previously stated.

To fully utilize the CDPD system, a network management system (NMS) is necessary. The NMS preferably monitors and directs the CDPD system at a location remote from the mobile data base stations, downloading new programming when appropriate. The network management system (NMS) has the capability of downloading software into any MDBS in the CDPD system via a network link using a special mobile data base station utility protocol (MUP). This protocol is carried out in addition to the physical layer, medium access control (MAC) layer and data link layer normally used by the MDBS according to the CSI layered communications architecture outlined in Appendix I (the part labelled Appendix A).

The network management system (NMS) is concerned with the management of the various open system interconnection (OSI) elements used for establishing, monitoring and controlling communications between the various system entities. The services provided include:

1. Names and addresses of users;

2. Determination of adequate resources annd authority to communicate;

3. Quality of service to be provided; and

4. Agreement on the protocols for exchanging data.

Additional information regarding the network management system is found in Appendix I (in the part labelled Appendix A).

The MDBS utility protocol (MUP) is a proprietary protocol which allows configuration, control and debug functions to be performed on the MDBS locally and remotely. This protocol will be used extensively in the initial phase of the MDBS software deployment to provide control access to the MDBS while a full feature network management system is not yet available. The MUP is capable of communicating with the MDBS via various transport and sub-network layers. In particular, the MUP will be carried out over a DS0 link using a network port 810, and over an RS-232 asynchronous link using the utility port 811 (FIG. 8). The MUP permits a "gateway" capability by which the MDBS network management software will access the MDBS utility software to provide utility functions. This is an alternate solution to the managing protocol for the MDBS described in Section 7.5 of the CDPD specification.

The MUP is a peer-to-peer protocol operating in an asynchronous balanced mode. Thus, all messages can be initiated at either the MDBS or the NMS since both ends are generally considered as DTE's (data termination equipment) in this particular implementation. This protocol supports full duplex communication as well as message "pipelining". A maximum of three outstanding unacknowledged send messages is permitted in this implementation.

The MUP is a byte-oriented protocol (meaning that the byte alignment between protocol data is guaranteed at the physical layer). It is assumed in this protocol that only an integral number of bytes is contained in the information field (as illustrated in Table I, page 4, of Appendix XVIII). This protocol requires that all frames start and end with a flag character (0×7E). This frame format consists of the aforementioned flag, an 8-bit address, an 8-bit control portion, an information portion having from 0 to 256 bytes, the first 8-bit frame check portion, a second 8-bit frame check portion and a second flag.

The 8-bit address field is divided into two sub-fields: protocol identifier (PID) and address. Bits 0–3 of this field are designated as the protocol identifier field which is used to provide the protocol compatibility check and allow the data link layer to support multiple data protocols. Bits 4–7 of this field is the device address field which is used to provide multiplexing capability so that the MUP controller can address its packet to either the primary or secondary control computer within an MDBS.

Figure 10:
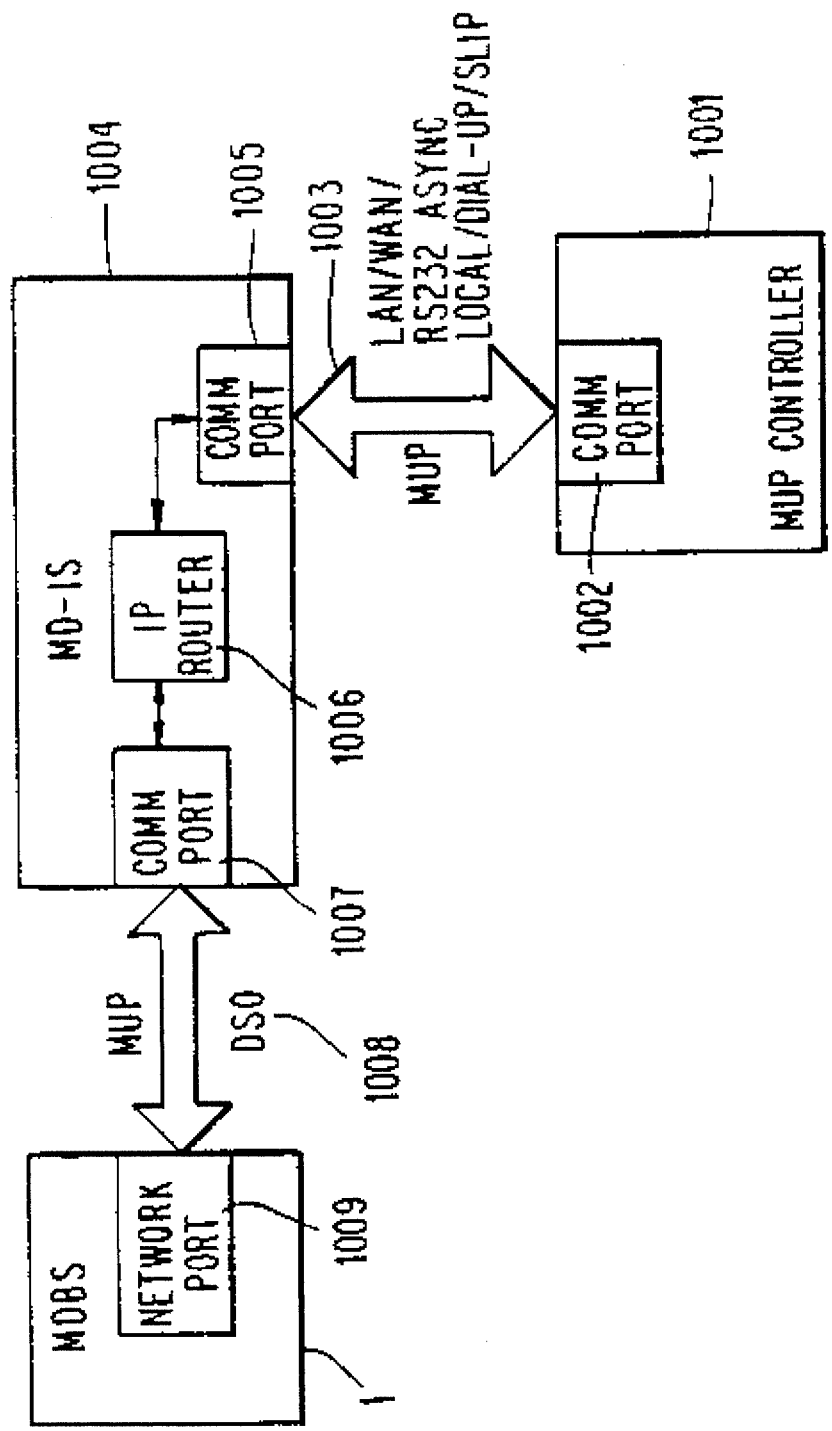
FIG. 10 is a block diagram illustrating connections between a mobile data base station and a network controller sending instruction data to that MDBS.

As illustrated in FIG. 10, the MUP controller 1001, connected preferably to the network management system for the CDPD system, initiates control signals or instructions to be received by the MDBS 1. These instructions are output over a communication port 1002 and transmitted to mobile data intermediate system (MD-IS) 1004 by means of an LAN/WAN or async connection (RS- 232) 1003. The MD-IS is expected to provide the necessary internet protocol (IP) routing functions (by means of IP router 1006) to direct the data package between the MUP controller 1001 and the MDBS 1. It is noted that in a LAN environment, both the MD-IS and the MUP controller are co-located as nodes on an Ethernet network and the MDBS is connected to the MD-IS via the DS0 link 1008. In a WAN environment, the MUP controller 1001 can be connected to the MD-IS 1004 via a WAN network such as X.25. If an async configuration is used, the MUP controller 1001 is connected to the MD-IS 1004 via an RS- 232 asynchronous serial connection. This can either be local or accessed via a remote dial-up.

The MUP controller 1001 is configured as a DTE and the data format used is: 1 start bit, 8 data bits, 1 stop bit and no parity. The baud rate supported include: 1200 bps, 2400 bps, 4800 bps, 9600 bps, 19,200 bps and 38.4 Kbps. However, high data rates may be available for internal engineering usage and the remote dial-up link may only support up to 9600 bps. Asa DTE device, the MUP controller 1001 will always assert the RTS and DTR modem control signals when it is on line and it expects to be presented with the appropriate DCE modem signaling (i.e., CTS, DCD and DSR should be asserted for proper communication). Further elaboration on this configuration can be found in Appendix XIII.

In the local configuration, the MUP controller will be co-located with the MD-IS on an Ethernet LAN. The MD-IS is responsible for providing IP routing capabilities for the data traffic between the MDBS 1 and the MUP controller 1001. Thus, network programming is provided from a network management system (NMS) to mobile data base stations throughout the CDPD system. Using this arrangement, it is possible to reprogram all the mobile data base stations through the master control computer board (if a master board exists) in each of the mobile data base stations. Likewise if a master control computer board is used for a plurality of mobile data base stations linked together, reprogramming of all of the mobile data base stations (each of the SNODEM boards) is carried out by downloading the programming to the master computer control board, and then downloading at the command of the master computer control board to the other portions of the mobile data base stations.

Figure 9:
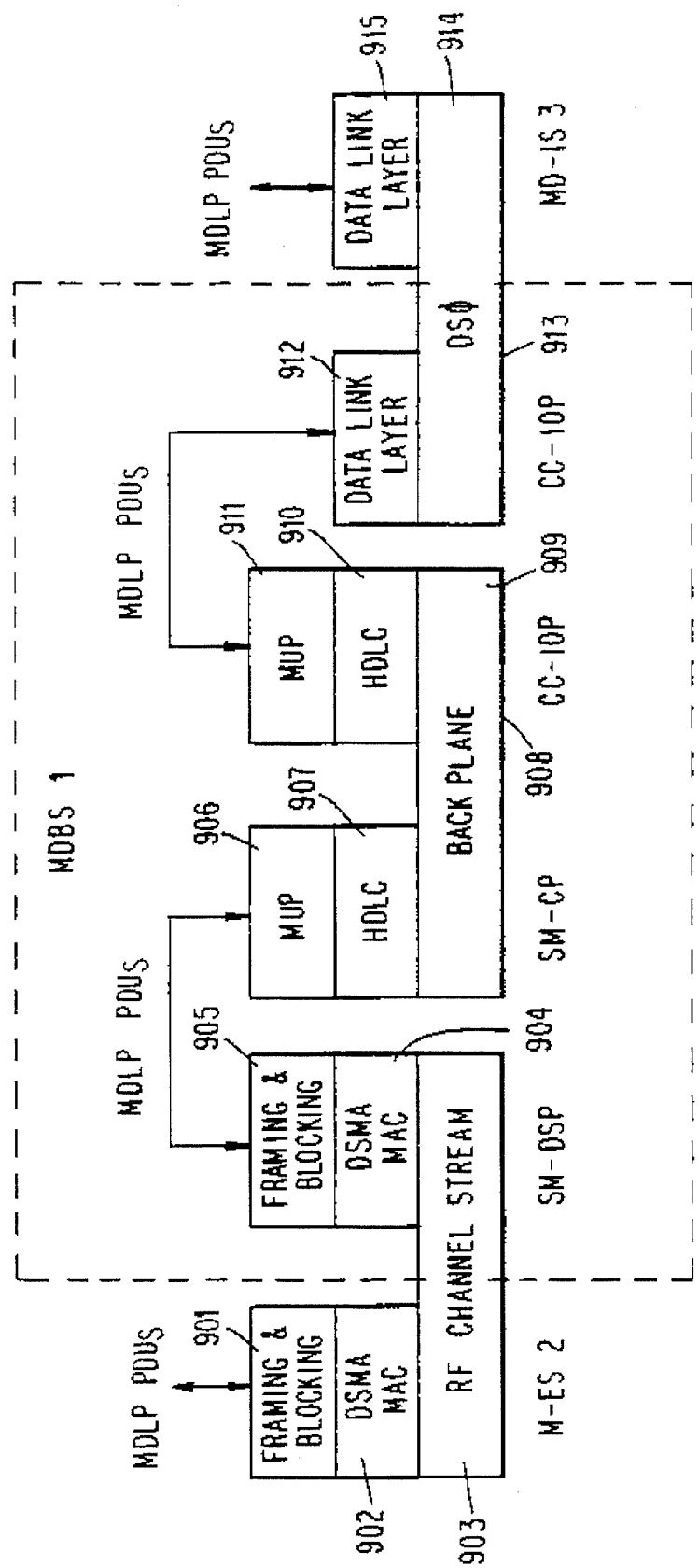
FIG. 9 is a block diagram/flow chart of protocols carried out in the CDPD communication process and correlation of that protocol to elements in the MDBS.

FIG. 9 illustrates a more detailed flow diagram correlating the data protocols to particular portions of the CDPD system. This figure further illustrates the occurrence of the MUP commands within the context of the overall data flow. Beginning in the reverse directions (communications beginning at the M-ES), a message from the mobile end system is arranged in mobile data link protocol (MDLP) arranged (??) in protocol data units (PDU). The message is framed and blocked (901) and run through the digital sense multiple access protocol to arbitrate access to the reverse channel stream between more than one M-ES at the mobile access control layer 902. This data then is transmitted into the RF channel stream 903 and received by the MDBS transceiver unit (not shown). The digital signal processors at 904 carry out the reverse of the map protocol used at 902. The reverse of the blocking and framing is carried out at 905 and the emergent instruction protocol such as a utility protocol MUP is transferred to the SNODEM I/O processor at 906. This MUP instruction data (or response data if received from the M-ES) is given the headers appropriate to the MUP protocol which allows data be routed throughout the internal CDPD system since the data packet is identified as to its contents and its source. The data is then routed by high-level data link control (HDLC) 907 through the backplane interfaced with the SNODEM board 908, through the backplane itself and into the backplane interface with the control computer board (at the I/O processor of the control computer board) 909. The HDLC format is decoded at 910 allowing the data MUP encapsulated by the MUP protocol to emerge 911.

The control processor of the control computer board will operate in response to MUP encapsulated instructions received or other external source such as the NMS over the utility port. The control processor will also be cognizant of MUP encapsulated data generated by the SNODEM board. Since the MUP encapsulated data is to be further transferred, it is operated on to produce MDLP protocol data units which are then acted on using data link layer protocol 912 in the control computer board I/O processor. Data is then configured for the DS0 link which carries the data from the MDBS 1 to mobile data intermediate system MD-IS 3 which is also connected to the DS0 line at portion 914. Other data is reconfigured for the data link layer 915 and emerges as MDLP protocol data units shown in FIG. 9 at the MD-IS. Because the MDBS utility protocol (MUP) identifies the nature of the data packet and its source, it can be used throughout the system to convey instructions on any part of the system such as the NMS to any of the mobile data base stations.

A major advantage of the present invention is that the CDPD mobile data base station can be provided at a normal AMPS base station with a minimum of space and no impact upon the AMPS system. The present invention is highly flexible due to its modular design in which gross functions of the MDBS are divided by means of separate boards stridably mountable in the MDBS casing. This flexibility is further facilitated by further sub-divisions of functionality amongst the elements found on the boards constituting the MDBS. The efficiency of the CDPD system is enhanced by a novel channel hopping scheme, and each MDBS in the CDPD system can be remotely programmed from a network management system for the entire CDPD system using a unique protocol to exchange data between the NMS and MDBS. Since size is critical in the layout of the MDBS, the use of a normal DAC or ADC devices is eliminated through the use of delta-sigma modulation. Because of the compactness and flexibility of the MDBS, it is easily arranged to share front-end equipment (such as duplexers, power amplifiers, splitters and antennas) with existing AMPS installations.

Although a number of arrangements of the present invention have been mentioned by way of example, it is not intended that the invention be limited thereto. For example, the present invention can be adapted with the appropriate use of utility ports and DS0 links to interconnect a plurality of mobile data base stations, all under the control of a single master control computer board. Accordingly, this invention should be considered to include any and all configurations, modifications, variations, combinations or equivalent arrangements falling within the scope of the following claims.

APPENDIX I

Mobile Data Base Station Users Guide, Document Part No. 2xx-Revision B, September 1993.

APPENDIX II

Preliminary Product Specification, Mobile Data Base Station, Jul. 12, 1993.

APPENDIX III

1) Cellular Digital Packet Data System Specification. Version 1.0, August 1993.
2) [IS-19-B] Recommended Minimum Standards for 800-MHz Cellular Subscriber Units, Electronic Industries Association. Document EIA/IS-19-B, May 1988.
3) [EIA/TIA-553] Mobile Station—Land Station Compatibility Specification. Electronic Industries Association Document EIA/TIA-553, September, 1989.
4) [EIA/TIA-496-A] Interface between Data Circuit-Terminating Equipment (DCE) and the Public Switched Telephone Network (PSTN), Document EIA/TIA 496-A. November, 1989.
5) [FCC-15] Part 15 of the Code of Federal Regulations, Title 47 (47 CFR), Radio Frequency Devices, October, 1991.
6) [FCC-22] Part 22 of the Code of Federal Regulations, Title 47 (47 CFR), Public Mobile, October, 1991.
7) [FCC-68] Part 68 of the Code of Federal Regulations, Title 47 (47 CFR), Connection of Terminal Equipment to the Telephone Network, October, 1991.
8) [RSS-118-003] Land and Subscriber Stations: Voice, Data and Tone Modulated, Angle Modulation Radiotelephone Transmitters and Receivers Operating in the Cellular Mobile Bands 824–849 MHz and 869–894 MHz., Document RSS- 188, Issue 2, May, 1990.
9) [UL-1950] Standard for Safety of Information Technology Equipment Including Electrical Business Equipment, March, 1989.
10) [UL-1459] Standard for Safety of Information Technology Equipment Including Electrical Business Equipment, December, 1987.
11) [CAN/CSA-C22.2] No. 225 and No. 950 (Safety of Information Technology Equipment, Including Electrical Business Equipment).

12) [DOC CS-03] Standard for Terminal Equipment, Terminal Systems, Network Protection Devices, Connection Arrangements and Hearing Aids Compatibility, February, 1990.
13) [EIA/IS-19-B] Recommended Minimum Standards for 800-MHz Cellular Subscriber Units, May, 1988.
14) [TIA/EIA-592] Asynchronous Facsimile DCE Control Standard, May, 1993.
15) [EIA/TIA-578] Asynchronous Facsimile DCE Asynchronous Facsimile DCE, November, 1990.
16) [EIA/TIA-470-A] Telephone Instruments with Loop Signalling, July, 1987.
17) [CCITT Volume VII—Fascicle VII.3] Terminal Equipment and Protocols for Telematic Services Recommendations T.0–T.63, Blue Book.
18) [CCITT Volume VIII—Fascicle VIII.1] Data Communication over the Telephone Network Series V Recommendations, Blue Book.
19) [CCITT V.17] Data Communications over the Telephone Network a 2-Wire Modem for Facsimile Applications with Rates up to 14,400 Bit/s—Recommendation V.17, 1991.
20) [CCITT V.32bis] Data Communication over the Telephone Network—a Duplex Modem Operating at Data Signalling Rates of p to 14,400 Bit/s for Use on the General Switched Telephone Network and on Leased Point-to-Point 2-Wire Telephone-Type Circuits—Recommendation V.32bis, 1991.
21) [CCITT V.42bis] Data Communication over the Telephone Network—Data Compression Procedures for Data Circuit Terminating Equipment (DCE) using Error Correction Procedures—Recommendation V.42bis, 1990.
22) [CCITT V.42bis] Data Communication over the Telephone Network—Data Compression Procedures for Data Circuit Terminating Equipment (DCE) using Error Correction Procedures—Recommendation V.42bis, 1990.
23) Product 1 Control Software High Level Design, Pacific Communication Sciences, Inc., Apr. 29, 1993.
24) ITU CCITT Series V Recommendations, V.21, V.22, V.22bis, V.27ter, V.29, V.32, V.42, V.42bis.
25) ITU CCITT Series T Recommendations, T.30, T.35.
26) IEC801.
27) Bell 212A.
28) EIA/TIA-562.
29) EIA/TIA-605, Facsimile Systems and Equipment—DCE-DTE Packet Protocol Standard, December, 1992.
30) MNP 5 Microcom Networking Protocol Update Letter Number 6, Mar. 30, 1987.
31) MNP 10 Microcom Networking Protocol Class 10 Specification 1.0, Oct. 21, 1991.
32) EIA PN2230 Multimode Handshaking.
33) EIA/IS-20A—Recommended Minimum Standards for 800-MHz Cellular Land Stations, May 1988.
34) EIA/TIA/IS-54B—Cellular System Dual Mode Mobile Station-Base Station Compatibility Standard, 1992.
35) EIA/TIA/IS-55—Recommended Minimum Performance Standards for 800 MHz Dual Mode Mobile Stations, December 1991.
36) RFC 791. Internet Protocol.
37) RFC 768. User Datagram Protocol.
38) Network Equipment Building System (NEBS) Generic Equipment Requirements, TR-NWT-000063, Issue 4, July 1991.
39) Canadian Safety Association (CSA), CAN/CSA-C22.2 No. 950-M 89.
40) Canadian Department of Communication (DOC), DOC RSS 118, Issue 2.
41) CCITT X.733, Information Technology—Open Systems Interconnection System Management: Alarm Reporting Function.

APPENDIX IV

System Specification for the Cellular Digital Packet Data System, Vols. 1–7, Jul. 19, 1993.

APPENDIX V

Memorandum dated Nov. 12, 1992, Derivation of Transfer Functions for delta-sigma Modulation.

APPENDIX VI

Cellular Digital Packet Data, Mobile Data Base Station, Snodem Control Processor Software High Level Design, Version 0.1 Feb. 3, 1992.

APPENDIX VII

Cellular Digital Packet Data, Mobile Data Base Station, Common Software, Software High Level Design, Version 1.3, Apr. 20, 1993.

APPENDIX VIII

Cellular Digital Packet Data (CDPD) Mobile Data Base Station (MDBS), Control Computer-Control Processor (CC-CP), Software High-Level Design, Version 1.0, Mar. 1, 1993.

APPENDIX IX

Cellular Digital Packet Data, Mobile Data Base Station, Control Computer Input/Output Processor, Software High Level Design, Version 0.4, Feb. 24, 1993.

APPENDIX X

Cellular Digital Packet Data, Mobile Data Base Station, PC Based Development Tool, Software High Level Design, Version 1.0, Jul. 27, 1993.

APPENDIX XI

Cellular Digital Packet Data, Mobile Data Base Station, CC-CP Mini File System (MFS), Software High Level Design, Version 0.1, Jul. 12, 1992.

APPENDIX XII

MDBS, Mobile Data Base Station, Installation Manual, Sep. 15, 1993.

APPENDIX XIII

Cellular Digital Packet Data, Mobile Data Base Station Utility Protocol, Interface Control Document, Version 0.3, Jul. 27, 1993.

APPENDIX XIV

Wiring diagrams for the Mobile Data Base Station Modem Digital Circuitry.

APPENDIX XV

Wiring diagrams for the Radio Frequency Modules.

APPENDIX XVI

Wiring diagram of the Back Plane Interface.

APPENDIX XVII

Wiring diagram of the Control Computer Board.

APPENDIX XVIII

Data flow through the SNODEM is illustrated in two drawings entitled "SNODEM" and "CONTROL COMPUTER", respectively. The SNODEM drawing illustrates the radio link and the two digital switching processors as well as their interface with the I/O processor of the SNODEM board. The "CONTROL COMPUTER" drawing illustrates in greater detail the I-O processor 801 (FIG. 8) of the control computer board 44, illustrating the link between utility port 801, network port 810 (to DS0 link), and the connection to backplane 42.

Referring to the drawing entitled "SNODEM", the data routing is explained with respect to data input at utility port 811 (FIG. 8) by utility PC 1130. This data is transferred using a utility driver 1101 to a router 1102 (part of the I/O processor). This input of data is used to simulate a signal input over a radio airlink.

The router 1102 will take the information from the utility driver and convert it back into format that can be used internally. That message will be sent directly to a queue 1103. It is noted that a queue is a message queue for arranging transmission over the backplane 1131. Data is fed from router 2 to backplane queue 1104 and from there the I/O processor which formats the data by inserting flags and performing a command response check. The plane is limited in accordance with eye level data link control (HDLC) formatting for transmission over the backplane 1131. From the backplane, the data will travel to the I/O processor illustrated in the drawing entitled Control Computer. A simulator 1201 will receive the data packet, frame the packet and add CRC. The frame flags are removed and the CRC checked at portion 1202. If everything is correct, the information would be sent to router queue 1203 and from there to router 1204. This router takes the message based on the routing information specified within the packet sent to the input queue message distributor 1206, analyzes the data packet contained in the message, and sends it to the appropriate tasking queue 1207. This is controlled by the frame relay task. This operates to pour the information from the queue and add the frame relay header. This occurs at 1208. The encapsulated data is transmitted to a transmit queue 1209. Collector 1210 performs a round robin selection from queue 1209 and feeds the appropriate encapsulated data to the portion of the control computer 1211 for transmission over the DS0 link. This includes inserting flags and running data from the DS0 link as received in portion 1212 which removes the frame flags and rejects bad frames (based upon a bad CRC). The messages are considered to be correct (proper format). The data is transmitted to buffer 1213 which handles the channel streams of data in random order. The frame header decoder 1214 removes the frame header. Sorter 1215 uses the header information to determine where the information should go and which particular transceiver in the SNODEM is supposed to receive that information. The sorter 1215 looks at the messages, decides which type of packet (such as MDLP, or IP) is used. Using this information, the data flow is controlled by flow control register 1216. From there the data moves to router 1204 and then to backplane transmission queue 1217, then to SCC portion 1201 for framing and CRC processing. From there the message will be sent over the backplane 1131.

From backplane 1131, the encapsulated message is transmitted to the SNODEM board (illustrated in the drawing entitled SNODEM) wherein portion 1106 of SCC, the frame flags will be removed and a CRC check made. From there the message is sent to input queue 1103. A message handler 1108 receives the message from queue 1103 and analyzes the packet ID to decide the destination of the message, and the proper format for that destination. After formatting the message, it is sent to dual port RAM (DPRAM) 1109 which contains a number of queues. For example, the message could be placed in a forward data queue within DPRAM 1109. From there, the message would be sent to digital switching processor 2 which contains a portion for framing the data 1110, portion for blocking the data 1111, and a portion for encoding the data 1112, and the addition of a pseudo random noise created by a sequence generator 1113. DSMA flag insertion is carried out at 1114. (Digital sense multiple access protocol is the technique used in CDPD systems to arbitrate access on the reverse channel stream between more than one mobile end system. The reverse channel status is signalled by the transmission of channel flags at periodic intervals on the forward channel since the mobile end systems cannot sense the status of the reverse channel directly.) The message with the flag added is then sent to a modulator 1115 and then to a radio transmitter 1116 for transmission over the airlink.

On the reverse link, the signal is received by transceiver 1116. Analog-to-digital conversion is carried out at 1117. The signal is buffered at 1118, and demodulated at 1119. Block buffer 1120 manipulates a sequence of data into manageable segments, and PN (pseudo random noise) remover 1121 will operate on the message signal to remove the noise added by an equivalent to noise generator 1113. Decoding and frame extraction take place at 1122 and 1123, respectively. The output of frame extractor 1123 is fed to a reverse data queue in DRAM 1109. The data is then handled by message handler 1108, and from there, the message will be routed as previously described for messages moving in the opposite direction.

APPENDIX XIX

XILINX, The Programmable Gate Array Company, Data Book, 1992.

We claim:

1. A mobile data base station (MDBS) configured to transfer cellular digital packet data (CDPD) between at least one mobile subscriber and an external communication network (MD-IS), said MDBS comprising:

a controller board operatively connected to said MD-IS via a data link, arranged to receive and convey operating instructions and comprising (a) a flash EPROM containing a boot-up code to initiate data flow into said MDBS, (b) a first SRAM arranged to increase the capacity of the first control processor, (c) a DRAM arranged to store operational codes used by said first control processor, and (d) a hard disk drive arranged to store all control programming in said MDBS, all (a), (b), (c) and (d) operatively connected to said first control processor;

a plurality of transceiver boards providing radio links to mobile subscribers, said transceiver boards each being separate and distinct from said controller board, wherein said MDBS is co-located with a cellular control and switching station configured as an Advanced mobile Phone System (AMPS) base station, wherein said controller board and said transceiver board are operatively interconnected through a backplane, wherein said controller board comprises a first control processor programmed for radio resource management and generation of control commands to said transceiver board and a first input/output (I/O) processor programmed for routing data throughout said MDBS, said first control processor and said first I/O processor being operatively connected to each other, wherein said first control processor is operatively connected to said data link through said first I/O processor, and said first I/O processor is also operatively connected to said backplane, wherein said first I/O processor is operatively connected to said backplane through a high level data link channel (HDLC), and wherein said controller board further comprises a dynamically programmable random access memory DRAM operatively connected to facilitated communication between said first control processor and said first I/O processor.

2. The MDBS of claim 1, wherein said controller board further comprises:

a second SRAM, operatively connected to said first I/O processor and arranged to enhance the capacity of said I/O processor, and a first field programmable gate array, operatively connected to said first I/O processor and said backplane.

3. A mobile data base station (MDBS) configured to transfer cellular digital packet data (CDPD) between at least one mobile subscriber and an external communication network (MD-IS), said MDBS comprising:

a controller board operatively connected to said MD-IS via a data link, arranged to receive and convey operating instructions a plurality of transceiver boards providing radio links to mobile subscribers, said transceiver boards each being separate and distinct from said controller board, wherein said MDBS is co-located with a cellular control and switching station configured as an Advanced Mobile Phone System (AMPS) base station, wherein said controller board and said transceiver board are operatively interconnected through a backplane, wherein at least one power supply board operatively connected to supply power to said controller board and said transceiver board through said backplane, said backplane comprising at least one HDLC serial bus line, wherein said power supply board comprises means for detecting power abnormalities throughout said power supply board, said backplate, said controller board and said transceiver board, wherein comprising a plurality of said controller boards, operatively connected through said backplane in a master/slave relationship between one of said controller boards designated as a master controller board and all remaining controller boards designated as slave controller boards, wherein said slave controller boards operate in a redundant fashion to said master controller board, and wherein said master/slave relationship between said plural controller boards is determined by respective mounting positions of each said controller board.

4. The MDBS of claim 3, wherein each said controller board comprises means for receiving external instruction data transmitted through a first utility port and a data link to an external communication network.

5. The MDBS of claim 4, wherein said master controller board comprises means for functional transmission of signals from said first utility port to said slave controller boards.

6. The MDBS of claim 5, wherein said master controller board comprises means for de-activating transmission of signals from said data link to said slave controller boards.

7. The MDBS of claim 6, wherein external instruction data from said first utility port and said network port is downloaded into said master controller board, said master controller board and said slave controller boards being operatively connected so that said external instruction data is downloaded from said master controller board into said slave controller boards.

8. The MDBS of claim 7, wherein each said controller board comprises a first field programmable gate array operatively connected to a first input/output (I/O) processor and said backplane and programmed to control data interface with said backplane.

9. The MDBS of claim 8, wherein said first field programmable gate array comprises means for determining the presence of boards in said distinct mounting positions, and means for determining status of said boards in respective distinct mounting positions.

10. The MDBS of claim 9, wherein said transceiver board comprises a transceiver portion, a modem portion and a control portion.

11. The MDBS of claim 10, wherein said transceiver portion comprises a first transmitter, a first receiver and a dedicated analog voice communication detector.

12. The MDBS of claim 10, wherein said transceiver portion comprises a second receiver operatively connected for a redundant operation with said first receiver.

13. The MDBS of claim 10, wherein said controller portion comprises a second input/output (I/O) processor, and a second utility port operatively connected to said second I/O processor.

14. A mobile data base station (MDBS) configured to transfer cellular digital packet data (CDPD) between at least one mobile subscriber and an external communication network (MD-IS), said MDBS comprising:

a controller board operatively connected to said MD-IS via a data link, arranged to receive and convey operating instructions a plurality of transceiver boards providing radio links to mobile subscribers, said transceiver boards each being separate and distinct from said controller board, wherein said MDBS is co-located with a cellular control and switching station configured as an Advanced Mobile Phone System (AMPS) base station, wherein said controller board and said transceiver board are operatively interconnected through a backplane, wherein said transceiver board comprises a transceiver portion, a modem portion and a control portion, wherein said controller portion comprises a second input/output (I/O) processor, and a second utility port operatively connected to said second I/O processor, and wherein a redundant DS0 data link connected to at least two of said controller boards.

15. The MDBS of claim 14, wherein said master controller board comprises means for operating said second DS0 link in a redundant fashion with said first DS0 link.

16. The MDBS of claim 11, wherein said modem portion comprises first and second digital signal processors (DSP).

17. The MDBS of claim 16, wherein said first DSP is operatively connected to said transceiver portion and said control portion.

18. The MDBS of claim 13, wherein said second I/O processor is operatively connected to said backplane via an HDLC channel.

19. A mobile data base station (MDBS) configured to transfer cellular digital packet data (CDPD) between at least one mobile subscriber and an external communication network (MD-IS), said MDBS comprising:

a controller board operatively connected to said MD-IS via a data link, arranged to receive and convey operating instructions a plurality of transceiver boards providing a radio links to mobile subscribers, said transceiver boards each being separate and distinct from said controller board, wherein said MDBS is co-located with an analog voice cellular control and switching station, wherein said controller board and said transceiver board are operatively interconnected through a backplane, wherein at least one power supply board operatively connected to supply power to said controller board and said transceiver board, through said backplane, said backplane comprising at least one HDLC serial bus line, wherein said power supply board comprises means for detecting power abnormalities throughout said power supply board, said backplane, said controller board and said transceiver board, wherein said controller boards, operatively connected through said backplane in a master/slave relationship between one of said controller boards designated as a master controller board and all remaining controller boards designated as slave controller boards, wherein said slave controller boards operate in a redundant fashion to said master controller board, wherein said master/slave relationship between said plural controller boards is determined by respective mounting positions of each said controller board, wherein each said controller board comprises means for receiving external instruction data transmitted through a first utility port and a data link to an external communication network, wherein said master controller board comprises means for functional transmission of signals from said first utility port to said slave controller boards, wherein said master controller board comprises means for de-activating transmission of signals from said data link to said slave controller boards, wherein external instruction data from said first utility port and said network port is downloaded into said master controller board, said master controller board and said slave controller boards being operatively connected to that said external instruction data is downloaded from said master controller board into said slave controller boards, wherein each said controller board comprises a first field programmable gate array operatively connected to a first input/output (I/O) processor and said backplane and programmed to control data interface with said backplane, wherein said first field programmable gate array comprises means for determining the presence of boards in said distinct mounting positions, and means for determining status of said boards in respective distinct mounting positions, wherein said transceiver board comprises a transceiver portion, a modem portion and a control portion, wherein said transceiver portion comprises a first transmitter, a first receiver and a dedicated analog voice communication detector, and wherein said dedicated analog voice communication detector is operatively connected to a digital signal processor (DSP).

20. A mobile data base station (MDBS) configured to transfer cellular digital packet data (CDPD) between at least one mobile subscriber and an external communication network (MD-IS), said MDBS comprising:

a controller board operatively connected to said MD-IS via a data link, arranged to receive and convey operating instructions control processor;

a plurality of transceiver boards providing radio links to mobile subscribers, said transceiver board being separate and distinct from said controller board, each said transceiver board including a processor operating to control said respective transceiver board and subject to control by said controller board, a backplane comprising at least a multi-drop serial bus connecting outputs of all of said controller board and said transceiver boards, means for determining status of said boards in respective distinct mounting positions, said controller board further comprising means for assigning use of communications channels to said transceiver boards via said backplane, wherein said MDBS is co-located with an analog voice cellular control and switching station, wherein said controller board and said transceiver board are operatively interconnected through a backplane, wherein at least one power supply board operatively connected to supply power to said controller board and said transceiver board through said backplane, said backplane comprising at least one HDLC serial bus line, wherein said power supply board comprises means for detecting power abnormalities throughout said power supply board, said backplane, said controller board and said transceiver board, wherein said controller boards, operatively connected through said backplane in a master/slave relationship between one of said controller boards designated as a master controller board and all remaining controller boards designated as slave controller boards, wherein said slave controller boards operate in a redundant fashion to said master controller board wherein said master/slave relationship between said plural controller boards is determined by respective mounting positions of each said controller board, wherein each said controller board comprises means for receiving external instruction data transmitted through a first utility port and a data link to an external communication network, wherein said master controller board comprises means for functional transmission of signals from said first utility port to said slave controller boards, wherein said master controller board comprises means for de-activating transmission of signals from said data link to said slave controller boards, wherein external instruction data from said first utility port and said network port is downloaded into said master controller board, said master controller board and said slave controller boards being operatively connected so that said external instruction data is downloaded from said master controller board into said slave controller boards, wherein each said controller board comprises a first field programmable gate array operatively connected to a first input/output (I/O) processor and said backplane and programmed to control data interface with said backplane, wherein said first field programmable gate array comprises means for determining the presence of boards in said distinct mounting positions, wherein said transceiver board comprises a transceiver portion, a modem portion, and a control portion, wherein said transceiver portion comprises a first transmitter, a first receiver and a dedicated analog voice communication detector, wherein said modem portion comprises first and second digital signal processors (DSP), wherein said dedicated analog voice communication detector is operatively connected to said first DSP, wherein said master control board further comprises means for generating signals indicative of alarm, health and status information regarding said MDBS, wherein said master controller board further comprises means for generating, signals indicative of protocol slot timing, wherein said master controller board generates signals indicative of master clock timing, and wherein said master controller board further comprises means for downloading control software to said transceiver boards.

21. The MDBS of claim 17, wherein said first DSP comprises means for terminating CDPD communication on a selected channel responsive to an output from said dedicated analog voice communication detector.

22. The MDBS of claim 21, wherein said output signal of said dedicated analog voice communication detector is isolated from said first control processor of said master controller board.

23. The MDBS of claim 16, wherein said second DSP comprises means for converting CDPD data blocks to and from HDLC frames.

24. The MDBS of claim 23, wherein said second DSP comprises means for carrying out error correction.

25. The MDBS of claim 24, wherein said error correction is effected by Reed-Solomon encoding.

26. A mobile data base station (MDBS) configured to transfer cellular digital packet data (CDPD) between at least one mobile subscriber and an external communication network (MD-IS), said MDBS comprising:

a controller board operatively connected to said MD-IS via a data link, arranged to receive and convey operating instructions a plurality of transceiver boards providing radio links to mobile subscribers, said transceiver boards each being separate and distinct from said controller board, means for determining status of said boards in respective distinct mounting positions, wherein said MDBS is co-located with an analog voice cellular control and switching station, wherein said controller board and said transceiver board are operatively interconnected through a backplane, wherein at least one power supply board operatively connected to supply power to said controller board and said transceiver board through said backplane, said backplane comprising at least one HDLC serial bus line, wherein said power supply board comprises means for detecting power abnormalities throughout said power supply board, said backplane, said controller board and said transceiver board, wherein said controller boards, operatively connected through said backplane in a master/slave relationship between one of said controller boards designated as a master controller board and all remaining controller boards designated as slave controller boards, wherein said slave controller boards operate in a redundant fashion to said master controller board, wherein said master/slave relationship between said plural controller boards is determined by respective mounting positions of each said controller board, wherein each said controller board comprises means for receiving external instruction data transmitted through a first utility port and a data link to an external communication network, wherein said master controller board comprises means for functional transmission of signals from said first utility port to said slave controller boards, wherein said master controller board comprises means for de-activating transmission of signals from said data link to said slave controller boards, wherein external instruction data from said first utility port and said network port is downloaded into said master controller board, said master controller board and said slave controller boards being operatively connected so that said external instruction data is downloaded from said master controller board into said slave controller boards, wherein each said controller board comprises a first field programmable gate array operatively connected to a first input/output (I/O) processor and said backplane and programmed to control data interface with said backplane, wherein said first field programmable gate array comprises means for determining the presence of boards in said distinct mounting positions, and said modem portion comprises means for converting analog signals to and from digital signals.

27. The MDBS of claim 26, wherein said means for converting comprise a second field programmable gate array.

28. The MDBS of claim 27, wherein said second field programmable gate array comprises means for carrying out delta-sigma modulation data conversion.

29. The MDBS of claim 28, wherein said second field programmable gate array comprises means for carrying out digital filtering.

30. The MDBS of claim 29, wherein said second field programmable gate array comprises means for phase lock loop signal generation.

31. The MDBS of claim 30, wherein said second field programmable gate array is operatively connected to said transceiver portion.

32. The MDBS of claim 31, wherein said modem portion further comprises:

a first SRAM operatively connected to said second DSP and said second field programmable gate array and arranged for holding and buffering data;

a second SRAM operatively connected to said second DSP and said second field programmable gate array and arranged for holding and buffering data;

a first DPRAM operatively connected to said field programmable gate array and operatively connected between said first DSP and said second DSP, and arranged for buffering data; and a second DPRAM operatively connected between first DSP and said second I/O processor and arranged for buffering data.

33. The MDBS of claim 32, wherein said control portion of said transceiver board comprises a third field programmable gate array, operatively connected to said second I/O processor, said second field programmable gate array and said backplane, said third field programmable gate array programmed to control data interface with said backplane.

34. The MDBS of claim 33, wherein said control portion further comprises an EPROM arranged to permit additional functions to said I/O processor and a third SRAM arranged to store operational codes, both said EPROM and said third SRAM being operatively connected to said second field programmable gate array and second I/O processor.

35. A mobile data base station (MDBS) configured to transfer cellular digital packet data (CDPD) between at least one mobile subscriber and an external communication network (MD-IS), said MDBS comprising:

a controller board operatively connected to said MD-IS via a data link, arranged to receive and convey operating instructions a plurality of transceiver boards providing radio links to mobile subscribers, said transceiver boards each being separate and distinct from said controller board, wherein said MDBS is co-located with a cellular control and switching station configured as an Advanced Mobile Phone System (AMPS) base station, wherein said controller board and said transceiver board are operatively interconnected through a backplane, wherein said controller board comprises a first control processor programmed for radio resource management and generation of control commands to said transceiver board and a first input/output (I/O) processor programmed for routing data throughout said MDBS, said first control processor and said first I/O processor being operatively connected to each other, wherein said controller board and said transceiver board comprise means for carrying out a plurality of communication protocols, and wherein said communication protocols include physical layer, medium access control layer, data link layer, and MDBS utility (MUP) and network layer.

36. A mobile data base station (MDBS) configured to transfer cellular digital packet data (CDPD) between at least one mobile subscriber and an external communication network (MD-IS), said MDBS having a controller board operatively connected to said MD-IS and a plurality of transceiver boards each providing radio links using a transceiver to at least one mobile subscriber, said controller board and said transceiver board comprising:

a. means for detecting full advanced mobile phone system (AMPS) communications on all radio frequency channels at said MDBS, said means for detecting being mounted on said transceiver board in addition to said transceiver;

b. means for deriving a queue of said radio frequency channels for CDPD use based upon AMPS use of said channels as detected by said means for detecting; and c. means for sending said queue of channels for CDPD to any mobile end systems within range of said MDBS for selection of at least one channel from said queue for use by at least one of said mobile end station.

37. A mobile data base station (MDBS) configured to transfer cellular digital packet data (CDPD) between at least one mobile subscriber and an external communication network (MD-IS), said MDBS having a controller board operatively connected to said MD-IS and a plurality of transceiver boards each providing radio links using a transceiver to at least one mobile subscriber, said controller board and said transceiver board comprising:

a. means for detecting advance mobile phone system (AMPS) communications on radio frequency channels used within said AMPS system, said means for detecting being mounted on said transceiver board in addition to said transducer;

b. means for deriving a list of said radio frequency channels for CDPD use based upon AMPS use of said channels as detected by said means for detecting;

c. means for periodically adjusting said list based upon detected AMPS use of said radio frequency channels; and d. means for sending data regarding said list to mobile end systems within range of said MDBS.

38. A mobile data base station (MDBS) configured to transfer cellular digital packet data (CDPD) between at least one mobile subscriber and an external communication network (MD-IS), said MDBS comprising:

a controller board operatively connected to said MD-IS via a data link and arranged to receive and convey operating instructions;

a plurality of transceiver boards providing radio links to mobile subscribers, said transceiver boards each being separate and distinct from said controller board, each said transceiver board including a processor operating to control said respective transceiver board and subject to control by said controller board; and, a backplane comprising at least a multi-drop serial bus connecting outputs of all of said controller board and said transceiver boards;

wherein said controller board further comprise means for assigning use of communications channels to said transceiver boards via said backplane;

wherein said MDBS is co-located with an analog voice cellular control and switching station;

wherein said controller board and said transceiver board are operatively interconnected through a backplane;

wherein said controller board comprises a first control processor programmed for radio resource management and generation of control commands to said transceiver board and a first input/output (I/O) processor programmed for routing data throughout said MDBS, said first control processor and said first I/O processor being operatively connected to each other;

wherein said first I/O processor is operatively connected to a first utility port; and, wherein said first I/O processor comprises means for receiving program instructions through said first utility port.

39. A mobile data base station (MDBS) configured to transfer cellular digital packet data (CDPD) between at least one mobile subscriber and an external communication network (MD-IS), said MDBS comprising:

a controller board operatively connected to said MD-IS via a data link and arranged to receive and convey operating instructions;

a plurality of transceiver boards providing radio links to mobile subscribers, said transceiver boards each being separate and distinct from said controller board, each said transceiver board including a processor operating to control said respective transceiver board and subject to control by said controller board; and a backplane comprising at least a multi-drop serial bus connecting outputs of all of said controller board and said transceiver boards;

said controller board further comprises means for assigning use of communications channels to said transceiver boards via said backplane;

wherein said controller board and said transceiver board are operatively interconnected through a backplane;

wherein said controller board comprises a first control processor programmed for radio resource management and generation of control commands to said transceiver board and a first input/output (I/O) processor programmed for routing data throughout said MDBS, said first control processor and said first I/O processor being operatively connected to each other;

wherein said first control processor is operatively connected to said data link through said first I/O processor, and said first I/O processor is also operatively connected to said backplane;

wherein said first I/O processor is operatively connected to said backplane through a high level data link channel (HDLC); and, wherein said controller board further comprises a dynamically programmable random access memory DPRAM operatively connected to facilitate communication between said first control processor and said first I/O processor.

40. A mobile data base station (MDBS) configured to transfer cellular digital packet data (CDPD) between at least one mobile subscriber and an external communication network (MD-IS), said MDBS comprising:

a controller board operatively connected to said MD-IS via a data link and arranged to receive and convey operating instructions;

a plurality of transceiver boards providing radio links to mobile subscribers, said transceiver boards each being separate and distinct from said controller board, each said transceiver board including a processor operating to control said respective transceiver board and subject to control by said controller board; and, a backplane comprising at least a multi-drop serial bus connecting outputs of all of said controller board and said transceiver boards;

wherein said controller board further comprise means for assigning use of communications channels to said transceiver boards via said backplane;

wherein said controller board and said transceiver board are operatively interconnected through a backplane;

wherein said controller board further comprises a first control processor programmed for radio resource management and generation of control commands to said transceiver board and a first input/output (I/O) processor programmed for routing data throughout said MDBS, said first control processor and said first I/O processor being operatively connected to each other;

wherein said first control processor is operatively connected to said data link through said first I/O processor, and said first I/O processor is also operatively connected to said backplane;

wherein said first I/O processor is operatively connected to said backplane through a high level data link channel (HDLC);

wherein said backplane comprises means for transmitting data between a plurality of said controller boards and said transceiver boards; and, wherein said means for transmitting comprises at least two HDLC serial bus lines.

41. A mobile data base station (MDBS) configured to transfer cellular digital packet data (CDPD) between at least one mobile subscriber and an external communication network (MD-IS), said MDBS comprising:

a controller board operatively connected to said MD-IS via a data link and arranged to receive and convey operating instructions;

a plurality of transceiver boards providing radio links to mobile subscribers, said transceiver boards each being separate and distinct from said controller board, each said transceiver board including a processor operating to control said respective transceiver board and subject to control by said controller board; and, a backplane comprising at least a multi-drop serial bus connecting outputs of all of said controller board and said transceiver boards;

wherein said controller board further comprises means for assigning use of communications channels to said transceiver boards via said backplane;

wherein said controller board and said transceiver board are operatively interconnected through a backplane;

wherein said controller board comprises a first control processor programmed for radio resource management and generation of control commands to said transceiver board and a first input/output (I/O) processor programmed for routing data throughout said MDBS, said first control processor and said first I/O processor being operatively connected to each other;

wherein said first control processor comprises means for managing radio channel allocation;

wherein said controller board comprises means for generating a health and status polling signal;

wherein said health and status polling signal is generated at least once per second.

42. The MDBS of claim 40, wherein said master control board further comprises means for generating signals indicative of alarm, health and status information regarding said MDBS.

43. The MDBS of claim 41, wherein said master controller board further comprises means for generating signals indicative of protocol slot timing.

44. The MDBS of claim 42, wherein said master controller board generates signals indicative of master clock timing.

45. A mobile data base station (MDBS) configured to transfer cellular digital packet data (CDPD) between at least one mobile subscriber and an external communication network (MD-IS), said MDBS comprising:

a controller board operatively connected to said MD-IS via a data link and arranged to receive and convey operating instructions;

a plurality of transceiver boards providing radio links to mobile subscribers, said transceiver boards each being separate and distinct from said controller board, each said transceiver board including a processor operating to control said respective transceiver board and subject to control by said controller board; and a backplane comprising at least a multi-drop serial bus connecting outputs of all of said controller board and said transceiver boards;

wherein said controller board further comprises means for assigning use of communications channels to said transceiver boards via said backplane;

wherein said controller board and said transceiver board are operatively interconnected through a backplane;

wherein said controller board comprises a first control processor programmed for radio resource management and generation of control commands to said transceiver board and a first input/output (I/O) processor programmed for routing data throughout said MDBS, said first control processor and said first I/O processor being operatively connected to each other;

wherein said controller board and said transceiver board comprise means for carrying out a plurality of communication protocols;

said first I/O processor further comprises means for developing a queue of suggested transfer channels based upon output signals from said dedicated analog voice communication detector; and wherein said queue information is transmitted from said MDBS to mobile subscribers on a periodic basis.

46. A mobile data base station (MDBS) configured to transfer cellular digital packet data (CDPD) between at least one mobile subscriber and an external communication network (MD-IS), said MDBS comprising:

a controller board operatively connected to said MD-IS via a data link and arranged to receive and convey operating instructions;

a plurality of transceiver boards providing radio links to mobile subscribers, said transceiver boards each being separate and distinct from said controller board, each said transceiver board including a processor operating to control said respective transceiver board and subject to control by said controller board;

a backplane comprising at least a multi-drop serial bus connecting outputs of all of said controller board and said transceiver boards; and, a plurality of front end equipment shared with said analog cellular voice base station;

wherein said controller board further comprises means for assigning use of communications channels to said transceiver boards via said backplane;

wherein said controller board and said transceiver board are operatively interconnected through a backplane;

wherein said controller board comprises a first control processor programmed for radio resource management and generation of control commands to said transceiver board and a first input/output (I/O) processor programmed for routing data throughout said MDBS, said first control processor and said first I/O processor being operatively connected to each other; and wherein said MDBS is co-located with an analog voice cellular base station.

47. A mobile data base station (MDBS) configured to transfer cellular digital packet data (CDPD) between at least one mobile subscriber and an external communication network (MD-IS), said MDBS comprising:

a controller board operatively connected to said MD-IS via a data link and arranged to receive and convey operating instructions;

a plurality of transceiver boards providing radio links to mobile subscribers, said transceiver boards each being separate and distinct from said controller board, each said transceiver board including a processor operating to control said respective transceiver board and subject to control by said controller board;

a backplane comprising at least a multi-drop serial bus connecting outputs of all of said controller board and said transceiver boards; and means for combining signals from three antennas;

wherein said controller board further comprises means for assigning use of communications channels to said transceiver boards via said backplane;

wherein said controller board and said transceiver board are operatively interconnected through a backplane;

wherein said controller board comprises a first control processor programmed for radio resource management and generation of control commands to said transceiver board and a first input/output (I/O) processor programmed for routing data throughout said MDBS, said first control processor and said first I/O processor being operatively connected to each other;

wherein said CDPD communication is carried out over a plurality of channels; and, wherein at least one said channel is dedicated to CDPD communication.

48. A mobile data base station (MDBS) configured to transfer cellular digital packet data (CDPD) between at least one mobile subscriber and an external communication network (MD-IS), said MDBS comprising:

a controller board operatively connected to said MD-IS via a data link and arranged to receive and convey operating instructions;

a plurality of transceiver boards providing radio links to mobile subscribers, said transceiver boards each being separate and distinct from said controller board, each said transceiver board including a processor operating to control said respective transceiver board and subject to control by said controller board; and, a backplane comprising at least a multi-drop serial bus connecting outputs of all of said controller board and said transceiver boards;

a plurality of antennas arranged to be shared with co-located analog voice equipment; and, a plurality of duplexers and radio frequency amplifiers arranged to be shaped with co-located analog voice equipment;

wherein said controller board further comprises means for assigning use of communications channels to said transceiver boards via said backplane;

wherein said controller board and said transceiver board are operatively interconnected through a backplane; and, wherein said controller board comprises a first control processor programmed for radio resource management and generation of control commands to said transceiver board and a first input/output (I/O) processor programmed for routing data throughout said MDBS, said first control processor and said first I/O processor being operatively connected to each other.

49. A mobile data base station (MDBS) configured to transfer cellular digital packet data (CDPD) between at least one mobile subscriber and an external communication network (MD-IS), said MDBS comprising:

a controller board operatively connected to said MD-IS via a data link and arranged to receive and convey operating instructions;

a plurality of transceiver boards providing radio links to mobile subscribers, said transceiver boards each being separate and distinct from said controller board, each said transceiver board including a processor operating to control said respective transceiver board and subject to control by said controller board; and a backplane comprising at least a multi-drop serial bus connecting outputs of all of said controller board and said transceiver boards;

said controller board further comprising means for assigning use of communications channels to said transceiver boards via said backplane;

at least one power supply board operatively connected to supply power to said controller board and said transceiver board through said backplane;

a chassis having means for slidably mounting said controller board, said transceiver board and said power board in a vertical position, said means for slidably mounting being divided into a plurality of distinct mounting positions for said controller board, said transceiver board and said power supply board;

wherein said MDBS is co-located with an analog voice cellular control and switching station;

wherein said controller board and said transceiver board are operatively interconnected through a backplane;

wherein said power supply board comprises means for detecting power abnormalities throughout said power supply board, said backplane, said controller board and said transceiver board;

wherein said means for slidably mounting includes distinct mounting positions for a plurality of said controller boards, a plurality of said transceiver boards and a plurality of said power supply boards;

wherein said MDBS comprises a plurality of said power supply boards, said plurality of power supply boards operating responsive to said means for detecting power abnormalities to operate in a redundant manner sharing lead from said controller boards and said transceiver boards; and wherein said power supply boards operate in a redundant manner responsive to at least one said controller board.

50. A mobile data base station (MDBS) configured to transfer cellular digital packet data (CDPD) between at least one mobile subscriber and an external communication network (MD-IS), said MDBS comprising:

a controller board operatively connected to said MD-IS via a data link and arranged to receive and convey operating instructions;

a plurality of transceiver boards providing radio links to mobile subscribers, said transceiver boards each being separate and distinct from said controller board, each said transceiver board including a processor operating to control said respective transceiver board and subject to control by said controller board; and a backplane comprising at least a multi-drop serial bus connecting outputs of all of said controller board and said transceiver boards;

said controller board further comprising means for assigning use of communications channels to said transceiver boards via said backplane;

at least one power supply board operatively connected to supply power to said controller board and said transceiver board through said backplane;

a chassis having means for slidably mounting said controller board, said transceiver board and said power board in a vertical position, said means for slidably mounting being divided into a plurality of distinct mounting positions for said controller board, said transceiver board and said power supply board;

wherein said MDBS is co-located with an analog voice cellular control and switching station;

wherein said controller board and said transceiver board are operatively interconnected through a backplane;

wherein said power supply board comprises means for detecting power abnormalities throughout said power supply board, said backplane, said controller board and said transceiver board;

wherein each of said distinctive mounting positions includes connector means to provide contact between respective boards and an HDLC serial bus on said backplane board, and each said connector means have a predetermined impedance suitable for inserting a board in a respective mounting position without creating power abnormalities.

51. A mobile data base station (MDBS) configured to transfer cellular digital packet data (CDPD) between at least one mobile subscriber and an external communication network (MD-IS), said MDBS comprising:

a controller board operatively connected to said MD-IS via a data link and arranged to receive and convey operating instructions;

a plurality of transceiver boards providing radio links to mobile subscribers, said transceiver boards each being separate and distinct from said controller board, each said transceiver board including a processor operating to control said respective transceiver board and subject to control by said controller board; and a backplane comprising at least a multi-drop serial bus connecting outputs of all of said controller board and said transceiver boards;

said controller board further comprising means for assigning use of communications channels to said transceiver boards via said backplane;

at least one power supply board operatively connected to supply power to said controller board and said transceiver board through said backplane;

a plurality of said controller boards, operatively connected through said backplane in a master/slave relationship between one of said controller boards designated as a master controller board and all remaining controller boards designated as slave controller boards;

wherein said MDBS is co-located with an analog voice cellular control and switching station;

wherein said controller board and said transceiver board are operatively interconnected through a backplane;

wherein said power supply board comprises means for detecting power abnormalities throughout said power supply board, said backplane, said controller board and said transceiver board;

wherein said slave controller boards operate in a redundant fashion to said master controller board.

52. A mobile data base station (MDBS) configured to transfer cellular digital packet data (CDPD) between at least one mobile subscriber and an external communication network (MD-IS), said MDBS comprising:

a controller board operatively connected to said MD-IS via a data link and arranged to receive and convey operating instructions;

a plurality of transceiver boards providing radio links to mobile subscribers, said transceiver boards each being separate and distinct from said controller board, each said transceiver board including a processor operating to control said respective transceiver board and subject to control by said controller board; and a backplane comprising at least a multi-drop serial bus connecting outputs of all of said controller board and said transceiver boards;

said controller board further comprising means for assigning use of communications channels to said transceiver boards via said backplane;

wherein said MDBS is co-located with an analog voice cellular control and switching station;

wherein said controller board and said transceiver board are operatively interconnected through a backplane;

wherein said controller board comprises a first control processor programmed for radio resource management and generation of control commands to said transceiver board and a first input-output (I/O) processor programmed for routing data throughout said MDBS, said first control processor and said first I/O processor being operatively connected to each other;

wherein said controller board and said transceiver board comprise means for carrying out a plurality of communication protocols; and wherein said first I/0 processor further comprises means for developing a queue of suggested transfer channels based upon output signals from said dedicated analog voice communication detector.

* * * * *